US010702874B2

(12) United States Patent
Kim et al.

(10) Patent No.: US 10,702,874 B2
(45) Date of Patent: Jul. 7, 2020

(54) APPARATUS FOR RECYCLING WASTE RAW MATERIAL

(71) Applicant: CERAMETAL CO., LTD., Eumseong (KR)

(72) Inventors: Hyung Ki Kim, Bucheon (KR); Young Ja Kim, Seoul (KR)

(73) Assignee: CERAMETAL CO., LTD., Eumseong-Gun (KR)

(*) Notice: Subject to any disclaimer, the term of this patent is extended or adjusted under 35 U.S.C. 154(b) by 897 days.

(21) Appl. No.: 15/031,693

(22) PCT Filed: Oct. 22, 2014

(86) PCT No.: PCT/KR2014/009919
§ 371 (c)(1),
(2) Date: Apr. 22, 2016

(87) PCT Pub. No.: WO2015/060630
PCT Pub. Date: Apr. 30, 2015

(65) Prior Publication Data
US 2016/0263581 A1   Sep. 15, 2016

(30) Foreign Application Priority Data
Oct. 25, 2013   (KR) .................... 10-2013-0127852

(51) Int. Cl.
| B02C 17/24 | (2006.01) |
| B02C 17/18 | (2006.01) |
| B02C 17/16 | (2006.01) |
| B02C 17/00 | (2006.01) |
| C22B 7/00 | (2006.01) |
| C22B 7/04 | (2006.01) |

(Continued)

(52) U.S. Cl.
CPC ........ *B02C 17/1855* (2013.01); *B02C 17/002* (2013.01); *B02C 17/007* (2013.01);
(Continued)

(58) Field of Classification Search
CPC ... B02C 17/1855; B02C 17/002; B02C 17/24; B02C 17/184; B02C 17/161;
(Continued)

(56) References Cited

U.S. PATENT DOCUMENTS 3,185,192 A * 5/1965 Delcellier ............... B27L 1/025
144/208.9
4,881,691 A * 11/1989 Oldengott ............. B65G 67/24
241/101.5
(Continued)

FOREIGN PATENT DOCUMENTS

| CN | 201208568 Y | 3/2009 |
| JP | S5440768 B2 | 12/1979 |

(Continued)

OTHER PUBLICATIONS

Tazaki 2009, JP 2009127094 Translation.*
(Continued)

*Primary Examiner* — Adam J Eiseman
*Assistant Examiner* — Bobby Yeonjin Kim
(74) *Attorney, Agent, or Firm* — STIP Law Group, LLC

(57) ABSTRACT

The present invention relates to an apparatus for recycling waste raw material, capable of melting and recycling, according to size, small-particle waste metal transported by a small-particle waste metal conveyer (411), medium-particle waste metal transported by a medium-particle waste metal conveyer (412), and large-particle waste metal transported by a large-particle waste metal conveyer (413), and of recycling slag transported by a slag conveyer (414) into cover material, thereby recycling resources as well as preventing environmental pollution in advance.

18 Claims, 20 Drawing Sheets

(51) Int. Cl.
  *B03C 1/30* (2006.01)
  *B03C 1/035* (2006.01)
  *B03C 1/033* (2006.01)
  *B02C 17/20* (2006.01)
  *B02C 17/22* (2006.01)

(52) U.S. Cl.
  CPC .......... *B02C 17/161* (2013.01); *B02C 17/184* (2013.01); *B02C 17/1835* (2013.01); *B02C 17/20* (2013.01); *B02C 17/22* (2013.01); *B02C 17/24* (2013.01); *B03C 1/035* (2013.01); *B03C 1/0335* (2013.01); *B03C 1/30* (2013.01); *C22B 7/005* (2013.01); *C22B 7/04* (2013.01); *Y02P 10/212* (2015.11)

(58) Field of Classification Search
  CPC ..... B02C 17/1835; B02C 17/20; B02C 23/14; B02C 23/38
  USPC .......................... 241/170–172, 178, 182, 74
  See application file for complete search history.

(56) References Cited

U.S. PATENT DOCUMENTS

| | | | | |
|---|---|---|---|---|
| 4,995,561 A | * | 2/1991 | Yukimi | B02C 17/02 |
| | | | | 241/178 |
| 5,832,583 A | * | 11/1998 | Wason | B02C 17/225 |
| | | | | 29/401.1 |
| 2010/0252395 A1 | * | 10/2010 | Lehtonen | B02C 21/026 |
| | | | | 198/300 |

FOREIGN PATENT DOCUMENTS

| | | | | | |
|---|---|---|---|---|---|
| JP | 56133429 A | * | 10/1981 | ............ | B02C 17/02 |
| JP | S6061048 A | | 4/1985 | | |
| JP | 62294140 A | | 12/1987 | | |
| JP | 10156329 A | | 6/1998 | | |
| JP | 11347434 A | | 12/1999 | | |
| JP | 2001223113 A | | 8/2001 | | |
| JP | 22003340301 A | | 12/2003 | | |
| JP | 2004275937 A | | 10/2004 | | |
| JP | 2009127094 A | * | 6/2009 | ............ | B02C 17/02 |
| JP | 2009127094 A | | 6/2009 | | |
| KR | 1020010111750 A | | 12/2001 | | |
| KR | 100958080 B1 | | 5/2010 | | |
| KR | 100992351 B1 | | 11/2010 | | |
| KR | 1020110087312 A | | 8/2011 | | |

OTHER PUBLICATIONS

Ebihara, Translation JP-56133429-A (Year: 1981).*
International Search Report for PCT/KR2014/009919 dated Dec. 30, 2014.

* cited by examiner

APPARATUS FOR RECYCLING WASTE RAW MATERIAL

CROSS-REFERENCE TO RELATED APPLICATIONS

This application is the U.S. National Phase under 35 U.S.C. § 371 of International Application No. PCT/KR2014/009919 filed on Oct. 22, 2014, which in turn claims the benefit of Korean Application No. 10-2013-0127852, filed on Oct. 25, 2013, the disclosures of which are incorporated by reference into the present application.

TECHNICAL FIELD

The present invention relates to an apparatus for recycling a waste raw material, and in particular to an apparatus for recycling a waste raw material wherein waste metal and slag can be recycled by an easier and quicker process in such a way that a waste raw material is prepared in advance and is subjected to impacts so as to take slag off from the waste metals.

BACKGROUND ART

A steel production process, in general, consists of an ironmaking process, a steelmaking process, a continuous casting process, and a rolling process.

The aforementioned ironmaking process is a process wherein iron ore and coal for coke making, and flaming coal are inputted into a blast furnace with about a 100 m height, and a hot air of 1,200° C. is blew into the blast furnace, and the coal for coke making burns, while generating heat which melts iron ore into a molten metal. This molten metal is called a hot metal.

The aforementioned steelmaking process is a process wherein the molten metal (a hot metal) produced in the blast furnace is rich in carbon and contains impurities, for example, phosphorus (P) and sulfur(S), and scrap iron and hot metal are inputted together into a steel converter, and pure oxygen is blew in, thus eliminating phosphorous, sulfur and carbon components. A clean molten metal from which impurities have been eliminated, is called ingot steel.

The aforementioned continuous casting process is a process wherein a liquid state ingot steel is inputted into a mold and is passed through a continuous casting machine, thus being cooled and solidified, whereby an intermediate material, for example, a slab, a bloom, a billet, etc. can be continuously produced, and the bloom may be made into a billet via a steel piece rolling mill and may be made into rod wires via a rod wire rolling mill, and the slab may be made into a thick plate via a thick plate rolling mill or into a hot rolled steel sheet via a hot rolling mill.

The aforementioned rolling process is a process wherein the slab, bloom, billet, etc. which have been produced through the continuous casting process are passed through a plurality of rotating rolls, thus elongating and thinning such materials by continuously applying force to them. This rolling process may be categorized into a hot rolling method and a cold rolling method.

The steel production may produce a lot of chips (waste metals) and a lot of slag which might be used when melting and producing iron. These waste metals and slag are called a waste raw material (in the present invention, the waste raw material is collectively referred to waste metals contained in other industrial wastes, slag, etc.). They are simply sorted out as wastes and are intended to be disposed in these days.

Prior Art Documents (10-2000-0032398): An apparatus for producing an ingot which may be used for a pig iron when making steel by recycling chips or slag.

FIG. 1 is a front view schematically illustrating the aforementioned apparatus for producing an ingot which may be used for a pig iron when making steel by recycling chips or slag. FIG. 2 is a plane view of FIG. 1, and FIG. 3 is a partial cross sectional and enlarged front view illustrating a compression and formation unit in FIG. 1.

As illustrated in FIGS. 1 to 3, the aforementioned apparatus for producing an ingot which may be used for a pig ion when making steel by recycling chips and slag includes a sorting-out unit 7 adapted to sort out, depending on particle sizes, the waste into a raw material which may be used for the sake of recycling and a scrap iron which is not intended to be used; transfer units 9 and 11 adapted to transfer the raw material separated by the sorting-out unit 7 toward crushing units 13 and 15, which will be described later; crushing units 13 and 15 adapted to mix the raw material transferred from the transfer units 9 and 11 with a solidifier and transfer them while crushing; separating units 17 and 19 adapted to separate the raw material which has passed through the crushing units 13 and 15, into a raw material which will be re-crushed and a raw material which will be compressed and processed; an input and transfer unit 21 adapted to transfer the compression raw material, which has passed through the separating units 17 and 19, toward a compression and formation unit 27, which will be described later; feedback transfer units 23 and 25 adapted to feedback the re-crushing raw material, which has not passed through the separating units 17 and 19, toward the transferring unit 11, a compression and formation unit 27 adapted to compress into an ingot shape the compression raw material which has been supplied from the input and transfer unit 21; and a discharge and transfer unit 31 adapted to transfer the ingot, which has been compressed by the compression and formation unit 27, to a product pallet 29.

According to the aforementioned apparatus for producing an ingot which may be used for a pig ion when making steel by recycling chips and slag, it is very difficult to sort out the wastes into the materials for a raw material and a scrap iron while passing them through the sorting-out unit 7 which is adapted to sort out, depending on the particle sizes, the wastes into a raw material which will be used for recycling and a scrap iron which will not be used. Since the transfer units 9 and 11 adapted to transfer the raw material sorted out by the sorting-out unit 7 toward the crushing units 13 and 15 and the crushing units 13 and 15 adapted to mix the raw material transferred by the transfer units 9 and 11 with a solidifier and transfer them while crushing are employed, the aforementioned apparatus inevitably requires an additional component, for example, a solidifier, etc. Moreover, the aforementioned system may become complicated since the raw material should be passed through the separating units 17 and 19 which are adapted to separate the raw material, which has passed through the crushing units 13 and 15, into the materials for a re-crushing and a compression and process. The feedback transfer units 23 and 25 should be further provided, which are adapted to feedback toward the transfer unit 11 the raw material for re-crushing which has not passed through the separating units 17 and 19. For this reason, an over-complicated process and configuration are inevitable in the aforementioned conventional apparatus.

DISCLOSURE OF INVENTION

Technical Problem

Accordingly, it is an object of the present invention to provide an apparatus for recycling waste raw materials wherein waste metals and slag can be recycled through an easy and quick process in such a way that a waste raw material is prepared in advance and is subjected to impacts so as to take and separate slag off from the waste metals.

It is another object of the present invention to provide an apparatus for recycling waste raw materials, wherein slag is taken off from waste metals, and the rests of the slag still attached on the waste metals are separated quickly before they are fixedly solidified, so a quick and good quality recycling can be carried out, and in particular the rests of the slag can be further separated from the waste metals in such a way to rotate the taken-off waste metals and slag together, which results in more enhanced cleaning effects of the waste metals.

It is further another object of the present invention to provide an apparatus for recycling waste raw materials, which is able to readily and quickly separate waste metals from the slag in such a way to use the magnetic force of a magnet.

It is still further another object of the present invention to provide an apparatus for recycling waste raw materials, which may allow to prevent in advance any air contamination in such a way to collect dusts using a dust collector, while more reliably removing the dusts, for example, slag dusts, etc. which may adhere to the waste metals.

It is still further another object of the present invention to provide an apparatus for recycling waste raw materials, which may be helpful to separate slag and recycle them into a land reclamation material (a soil for land reclamation).

It is still further another object of the present invention to provide an apparatus for recycling waste raw materials, which may make it possible to carry out a quick and reliable slag taking-off work in such a way that a crushing drum is rotated by the torque of a crushing motor while being supported by a crushing support roller, and the slag can be taken off from the waste metal by applying rotational impacts to the waste raw materials.

It is still further another object of the present invention to provide an apparatus for recycling waste raw materials, wherein a waste raw material taking-off work can be carried out in a safer way since any position deviations of a waste raw material can be compensated by a position control rim and a position control roller during the rotations of a crushing drum.

It is still further another object of the present invention to provide an apparatus for recycling waste raw materials, wherein waste metals and slag can be more quickly pushed toward the side of an exit in such a way to provide a predetermined inclination by means of which the mouth of a crushing drum can get higher when a base ascends about a hinge with the aid of a hydraulic cylinder.

It is still further another object of the present invention to provide an apparatus for recycling waste raw materials, which is able to enhance a cleaning effect of waste metals, namely, a slag removing effect.

It is still further another object of the present invention to provide an apparatus for recycling waste raw materials, which is able to prevent in advance any potential hard cleaning in case of waste metals covered with micro dusts in such a way that residual slag stuck on waste metals are cleaned using a porous cleaning drum, thus letting the micro dusts drop downward while discharging thick particles via an OUTPUT.

It is still further another object of the present invention to provide an apparatus for recycling waste raw materials, which is able to readily establish a recycling environment of waste metals and slag in such a way that waste raw materials are prepared in advance, and slag is taken off from waste metals after causing impacts to waste raw materials using a crusher, and the waste metal and slag are separated using a sorter.

It is still further another object of the present invention to provide an apparatus for recycling waste raw materials, wherein waste metals are sorted out into a small-particle (for example, below 7 mm), a medium-particle (for example, 7~75 mm), and large-particle (for example, over 75 mm) and are subjected to a recycling process, by means of which the thusly sorted-out materials can be more usefully utilized when melting and reproducing the waste metals.

It is still further another object of the present invention to provide an apparatus for recycling waste raw materials, wherein a porous central sorting drum can be readily manufactured so as to sorting out the waste metals into a small-particle, a medium-particle and a large-particle, thus covering from an input mouth to an intermediate portion of a porous sorting drum, and an entrance polygonal sorting drum with small-particle holes is provided, whereupon the easiness in terms of a facility manufacturing can be greatly improved.

It is still further another object of the present invention to provide an apparatus for recycling waste raw materials, wherein a small-particle waste metal transferred via a small-particle waste metal conveyer, a medium-particle waste metal transferred via a medium-particle waste metal conveyer, and a large-particle waste metal transferred via a large-particle waste metal conveyer are melted separately based on their sizes and recycled, and the slag transferred via a slag conveyer can be recycled into a land reclamation material. For this reason, a resource recycling effect can be obtained, and any environment contamination can be prevented in advance.

Technical Solution

To achieve the above objects, there is provided a method for recycling waste raw materials according to the present invention which may include, but is not limited to, a step S10 for preparing waste raw materials mixed with slag and waste metals, a step S20 for taking slag off from the waste metals by applying impacts to the waste raw materials, and a step S30 for separating the waste metals from the slag, and in the step S30, the waste metals are separated by size and are recycled.

To achieve the above objects, there is provided an apparatus for recycling waste raw materials, which may include, but is not limited to, a crusher which is adapted to accommodate waste raw materials mixed with slag and waste metals and take the slag off from the waste metals; and a separator which is able to separate the waste metals and slag which have been taken off by the crusher.

To achieve the above objects, there is provided an apparatus for recycling waste raw materials, which may include, but is not limited to, a crusher which is adapted to accommodate waste raw materials mixed with slag and waste metals and take the slag off from the waste metals; and a separator which is able to separate the waste metals and slag which have been taken off by the crusher, wherein the crusher may include a base which is installed on the ground;

a crushing drum which is formed of an inlet and an outlet configured to receive and discharge the waste raw materials and is able to generate impacts during the rotations thereof;

a crushing motor which is mounted on the base and is adapted to provide torque to the crushing drum; and a crushing support roller which is mounted on the base and is able to support the crushing drum.

Advantageous Effects

According to the present invention, waste metals and slag can be recycled through an easy and quick process in such a way that a waste raw material is prepared in advance and is subjected to impacts so as to take slag off from the waste metals.

In the present invention, slag is taken off from waste metals, and the rests of the slag still attached on the waste metals may be separated quickly before they are fixedly solidified, so a quick and good quality recycling can be carried out, and in particular the rests of the slag can be further separated from the waste metals in such a way to rotate the taken-off waste metals and slag together, which results in more enhanced cleaning effects of the waste metals.

The present invention is able to readily and quickly separate waste metals from the slag in such a way to use the magnetic force of a magnet.

The present invention may allow to prevent in advance any air contamination in such a way to collect dusts using a dust collector, while more reliably removing the dusts, for example, slag dusts, etc. which may adhere to the waste metals.

The present invention may be helpful to separate slag and recycle them into a land reclamation material (a soil for land reclamation).

The present invention may allow to more quickly and easily produce waste metals and slag in such a way that slag is taken off from waste metals since a crusher applies impacts to waste raw materials, and then immediately waste metals and slag are separated using a separator.

The present invention may make it possible to carry out a quick and reliable slag taking-off work in such a way that a crushing drum is rotated by the torque of a crushing motor while being supported by a crushing support roller, and the slag can be taken off from the waste metal by applying rotational impacts to the waste raw materials.

The present invention may have effect on maximizing a slag taking-off operation between waste metals and slag by filling steel balls in a crushing drum.

The present invention may have effect on minimizing any frictional force which may occur during the rotation of a crushing drum since a crushing support roller is made of a tire.

The present invention may have effect on easier torque transfer in such a way that the torque of a crushing motor is transferred via a crushing sprocket engaged with a crushing chain engaged with crushing teeth formed at an outer circumference of the crushing drum.

According to the present invention, a waste raw material taking-off work can be carried out in a safer way since any position deviations of a waste raw material can be compensated by a position control rim and a position control roller during the rotations of a crushing drum.

According to the present invention, waste metals and slag can be more quickly pushed toward the side of an exit in such a way to provide a predetermined inclination by means of which the mouth of a crushing drum can get higher when a base ascends about a hinge with the aid of a hydraulic cylinder.

The present invention may have effect on a long service life due to good durability in such a way to make a crushing drum formed of a cylindrical body, a cushioning plate and an abrasion resistant steel plate.

The present invention is able to enhance a cleaning effect of waste metals, namely, a slag removing effect.

The present invention may make it possible to prevent in advance any potential hard cleaning in case of waste metals covered with micro dusts in such a way that residual slag stuck on waste metals are cleaned using a porous cleaning drum, thus letting the micro dusts drop downward while discharging thick particles via an OUTPUT.

The present invention may have effect on maximizing impacts which apply to waste metals and slag during the rotation by providing a porous cleaning drum which is shaped polygonal.

The present invention may have effect on enhancing the cleaning effects of waste metals in such a way that a cylindrical porous cleaning case is engaged to an outer circumference of a porous cleaning drum since residual slags won't be easily taken off in case where waste metals and slag are formed of micro particles, whereupon the micro particles which have separated from the porous cleaning drum may repeatedly collide again inside the cylindrical porous cleaning case, by means of which the residual slag can be separated and taken off at a time.

The present invention may have effect on protecting the porous cleaning drum and the cylindrical porous cleaning case since an upper cleaning housing and a lower cleaning housing are disposed covering the outer circumferences of the cylindrical porous cleaning case.

The present invention may allow to readily push the waste metals and slag from the INPUT to the OUTPUT during the rotations in such a way to provide a cleaning blade which is formed spiral toward from the INPUT to the OUTPUT at the inner side of the porous cleaning drum.

The present invention may allow the porous cleaning drum to smoothly rotate by employing a steel roller which is contacting with the tire ring provided at an outer circumference of the porous cleaning drum, wherein the steel roller is intended to operate as a cleaning support roller.

According to the present invention, waste metals are sorted out into a small-particle (for example, below 7 mm), a medium-particle (for example, 7~75 mm), and large-particle (for example, above 75 mm) and are subjected to a recycling process, by means of which the thusly sorted-out materials can be more usefully utilized when melting and reproducing the waste metals.

According to the present invention, a porous central sorting drum can be readily manufactured so as to sorting out the waste metals into a small-particle, a medium-particle and a large-particle, thus covering from an input mouth to an intermediate portion of a porous sorting drum, and an entrance polygonal sorting drum with small-particle holes is provided, whereupon the easiness in terms of a facility manufacturing can be greatly improved.

The small-particle waste metals and slag are intended to pass through the porous central sorting drum and the entrance polygonal sorting drum and are intended to drop onto the small-particle conveyer, and the medium-particle waste metals and slag are intended to pass through the porous central sorting drum and are intended to drop onto the medium-particle conveyer or are intended to sorted out by the entrance polygonal sorting drum and then are intended to drop onto the medium-particle conveyer, and the large-particle waste metals and slag are intended to drop onto the large-particle conveyer via a discharge port, whereby the waste metals and slag can be readily sorted out by size.

The present invention may have effect on allowing the waste metals and slag to be quickly discharged from the input mouth to the discharge port with the aid of the sorting blade which is installed at the inner side of the porous central sorting drum, which is formed spiral toward from the input mouth to the discharge port.

According to the present invention, the cleaning support roller may have effect on more smoothly rotating the porous cleaning drum in such a way to employ a steel roller which is contacting with the tire ring provided at the outer circumference of the porous cleaning drum.

The present invention may have effect on an easier and quicker separation of the waste metals from slag in such a way to separate the waste metals from the slag with the aid of magnetic force.

The present invention may allow to carry out works quickly in such a way that a small-particle waste metal conveyer, a medium-particle waste metal conveyer and a large-particle waste metal conveyer are disposed in parallel at a small-particle conveyer, a medium-particle conveyer, and a large-particle conveyer thus quickly transferring the waste metals by particle size. The slag conveyer may be disposed in an orthogonal direction below an end portion of each of the small-particle conveyer, the medium-particle conveyer, and the large-particle conveyer, whereby all the slag can be transferred at a time. The works can be more quickly carried out since the waste metals can be sorted out by size from the slag with the aid of a small-particle electromagnet module (the magnetic force can be controlled with the on/off of current), a medium-particle electromagnet module (the magnetic force can be controlled with the on/off of current), and a large-particle electromagnetic module (the magnetic force can be controlled with the on/off of current) and then can be transferred.

According to the present invention, any environment contamination can be prevented in advance while recycling resource in such a way that the small-particle waste metal transferred via a small-particle waste metal conveyer, the medium-particle waste metal transferred via a medium-particle waste metal conveyer, and the large-particle waste metal transferred via a large-particle waste metal conveyer can be melted and recycled by size, and the slag transferred via a slag conveyer can be recycled into a land reclamation material, whereby the resource can be recycled, and any environment contamination can be prevented in advance.

BEST MODES FOR CARRYING OUT THE INVENTION

Figure 1:
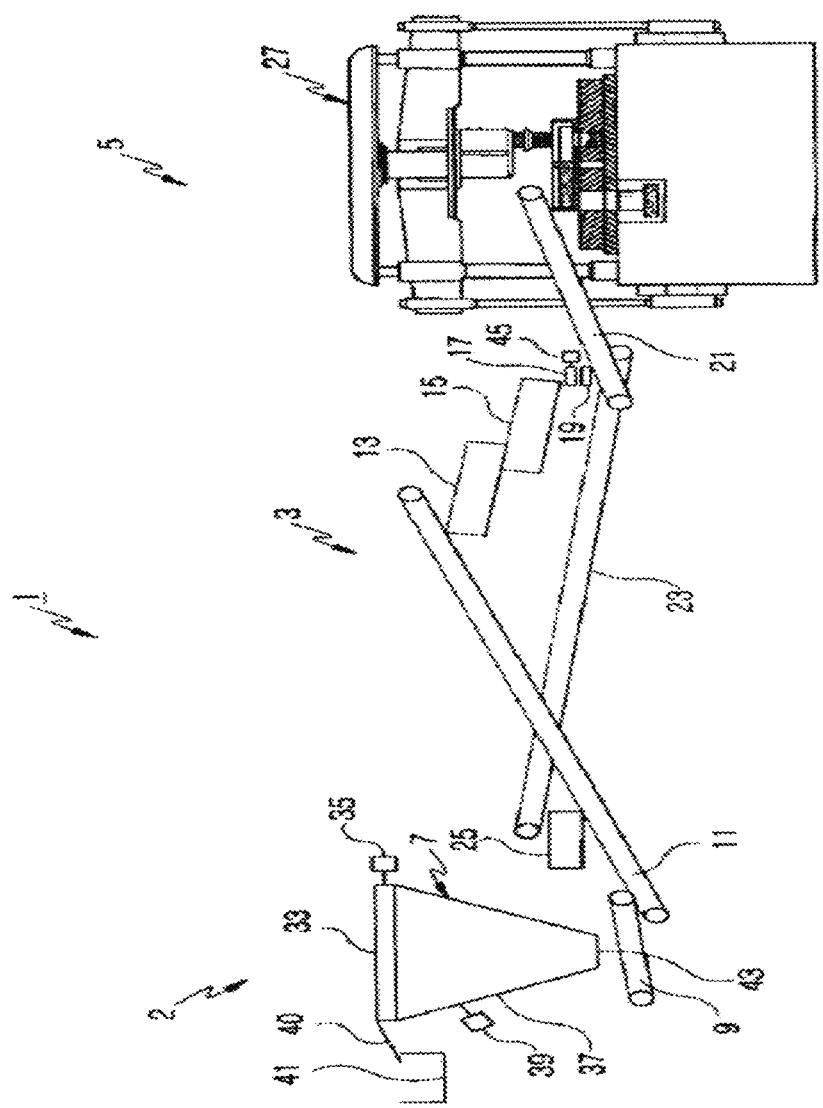
FIG. 1 is a schematic front view illustrating an apparatus for producing an ingot which may be used for a pig iron when making steel by recycling chips or slag which is described in the prior art document.
Figure 2:
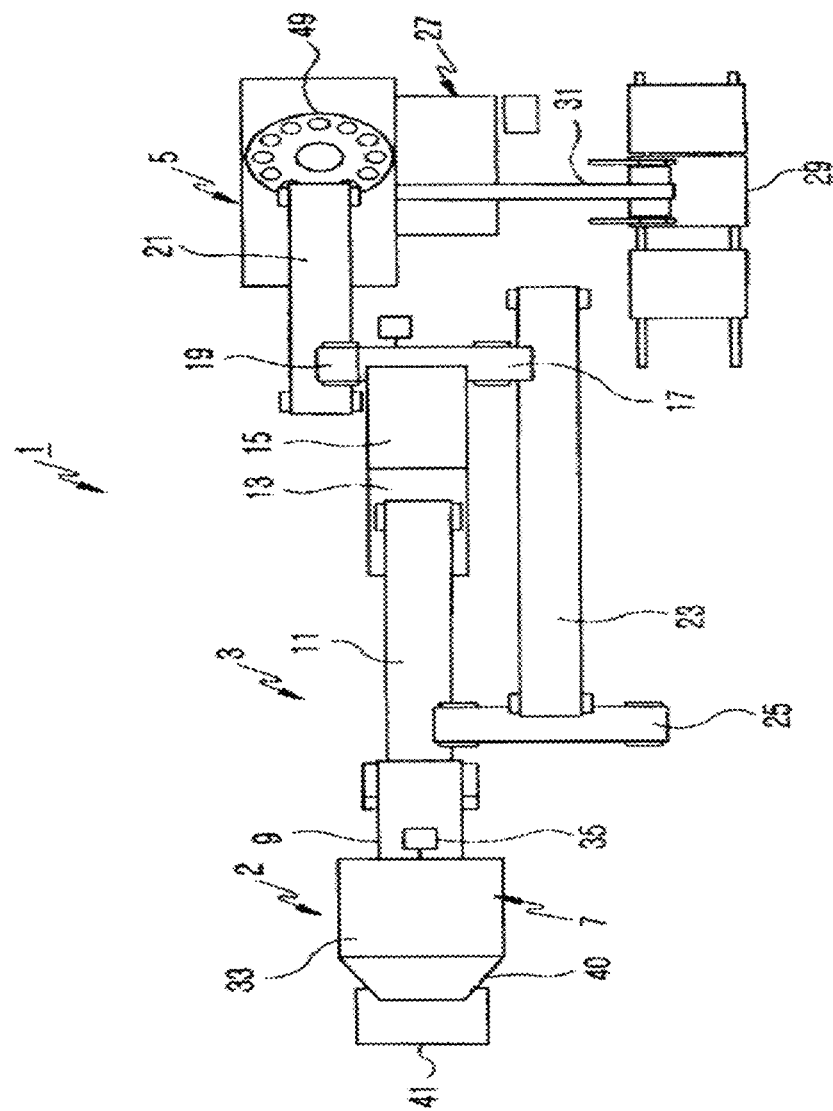
FIG. 2 is a plane view of the configuration in FIG. 1.
Figure 3:
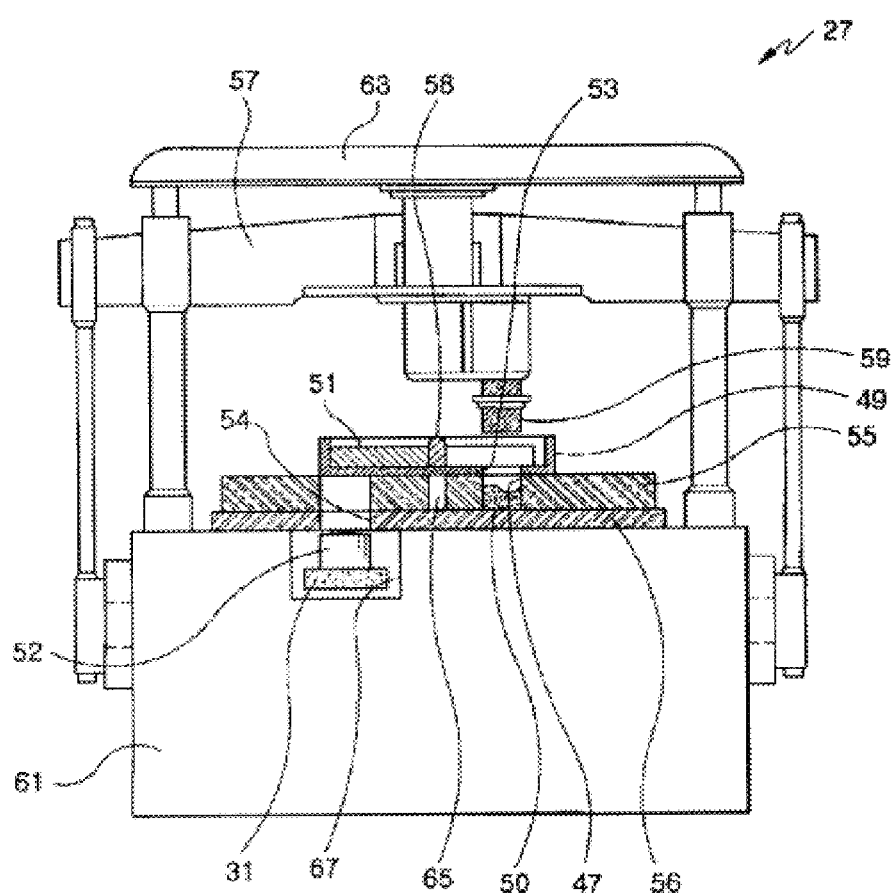
FIG. 3 is a partial cross sectional and enlarged front view illustrating a compression and formation unit in FIG. 1.

The best mode for carrying out the present invention is directed to an apparatus for recycling waste raw materials which may include, but is not limited to, a crusher 100 adapted to accommodate waste raw materials mixed with slag and waste metals and take slag off from waste metals by applying impacts, and a separator 400 adapted to separate the waste metals and slag which have been taken off by the crusher 100. The crusher 100 may include a base 110 installed on the ground, a crushing drum 120 which is formed of an inlet 121a and an outlet 121b configured to receive and discharge the waste raw materials via them and is able to cause impacts while rotating, a crushing motor 130 which is mounted on the base 110 and is adapted to generate torque to the crushing drum 120, and a crushing support roller 140 which is mounted on the base 110 and is able to support the crushing drum 120.

MODES FOR CARRYING OUT THE INVENTION

The apparatus for recycling waste raw materials according to the present invention will be described with reference to the accompanying drawings. There may be multiple embodiments, and the objects, features and advantages of the present invention can be well understood by way of such embodiments.

Figure 4:
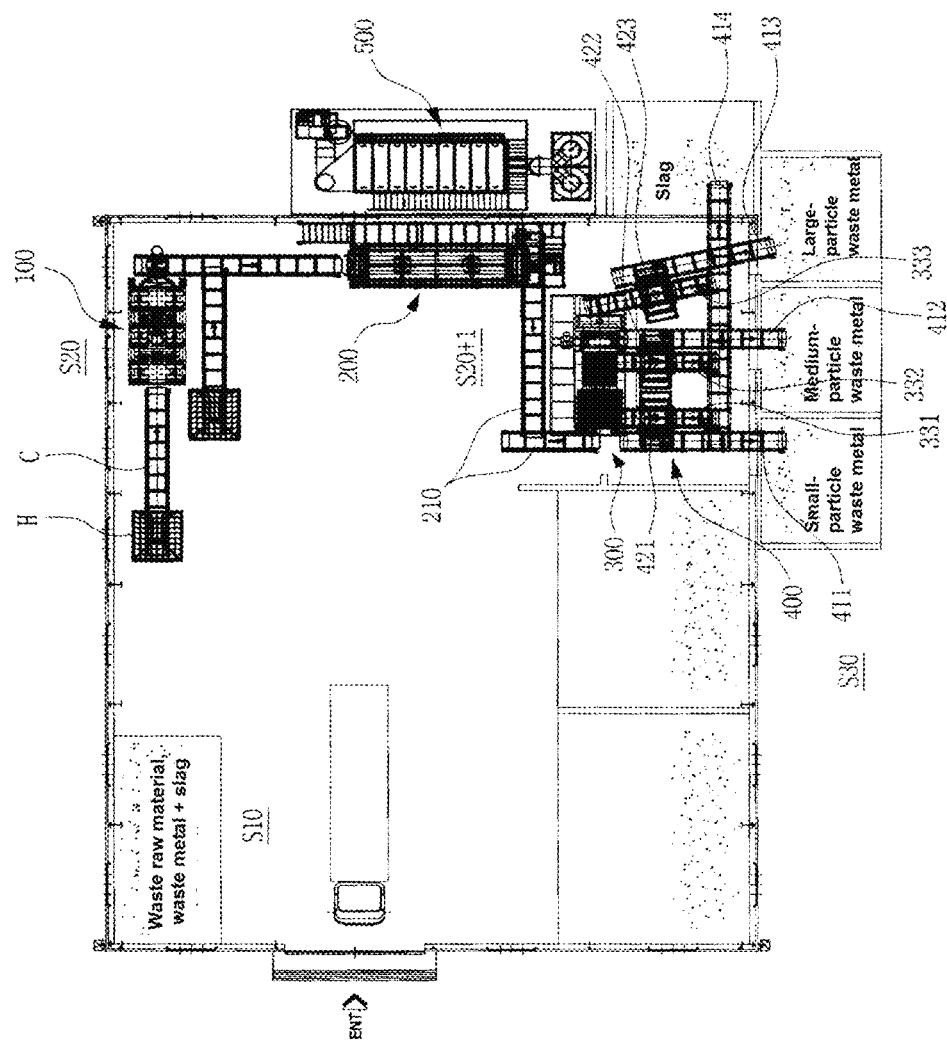
FIG. 4 is a view illustrating the whole configuration of a method and apparatus for recycling waste raw materials according to the present invention.
Figure 5:
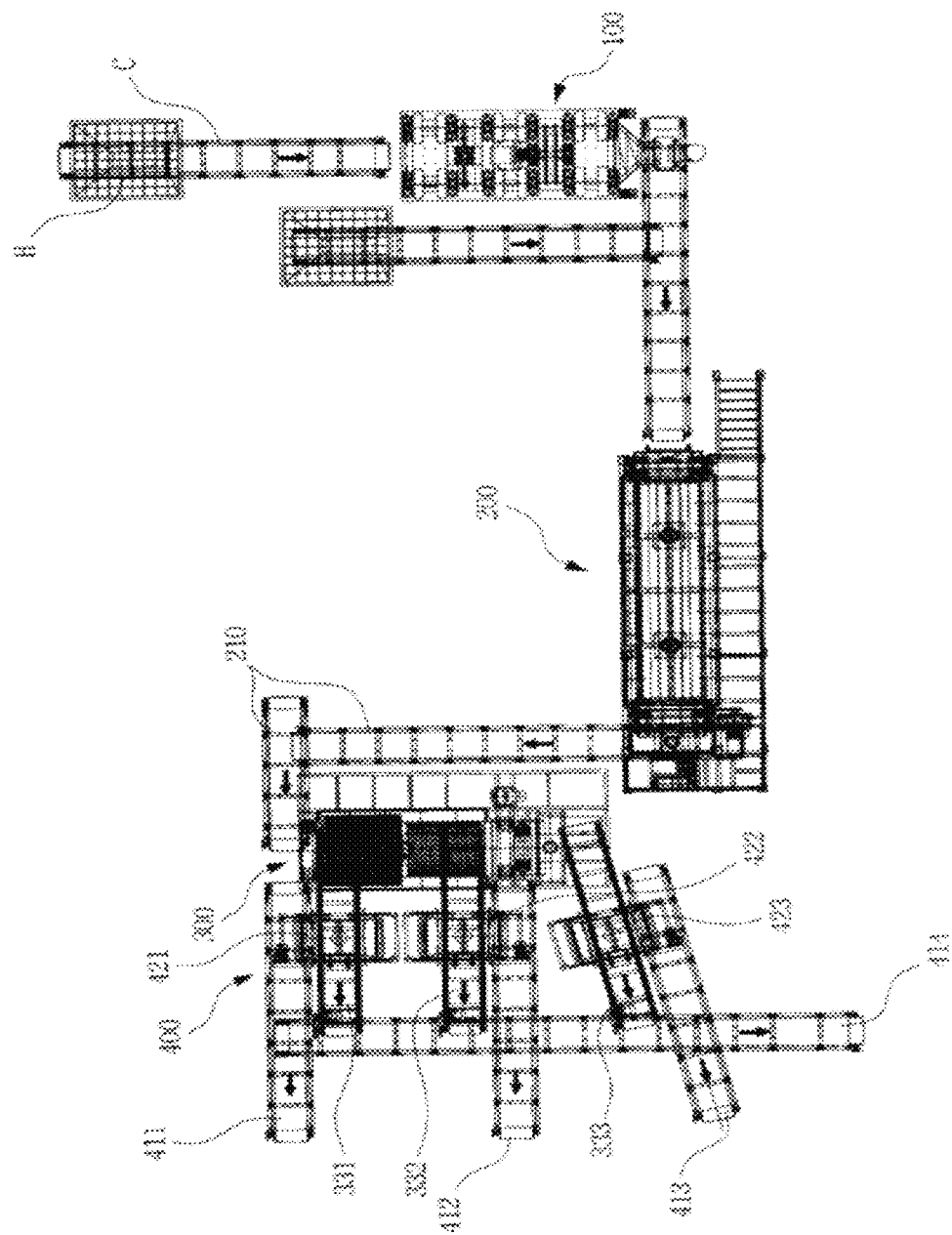
FIG. 5 is a detailed configuration view illustrating a method and apparatus for recycling waste raw materials according to the present invention.

FIG. 4 is a view illustrating the whole configuration of a method and apparatus for recycling waste raw materials according to the present invention. FIG. 5 is a detailed configuration view illustrating a method and apparatus for recycling waste raw materials according to the present invention.

As illustrated in FIG. 4, the method for recycling waste raw materials according to the present invention may include, but is not limited to, a step S10 for preparing waste raw materials mixed with slag and waste metals, a step S20 for taking slag off from the waste metals by applying impacts to the waste raw materials, and a step S30 for separating the waste metals from the slag.

Since the waste raw materials are previously prepared, and the slag is taken off from the waste metals by applying impacts to the waste raw materials and is separated therefrom, the waste metals and slag can be recycled by an easier and quicker method, thus maximizing the recycling.

In the step S30, since the waste metals are separated by size and recycled, the invention may be more useful when melting and recycling the waste metals.

In the step S10, the waste raw materials may include a lump of the waste raw materials which has been previously cut using a plasma.

If the waste raw materials are too large, it may be a little hard to take the slag off from the waste metals. In this case, it is preferred that the large waste raw materials are quickly previously cut in advance using a plasma torch into pieces of 301~1200 mm which are large enough to be inserted into the blast furnace for the sake of recycling melting.

In the step S10, it is preferred that a lump of the waste raw materials may be cut using plasma after it has been previously shot-processed.

Since the slag is taken off after a lump of the waste raw materials has been shot-processed, it can be more easily cut when cutting with a plasma torch, whereby workability can be maximized, and the purity of metals can be greatly enhanced when recycling.

After the step S20, there may be a step S20+1, wherein the waste metals and slag are rotated together, thus taking the residual slag off from the waste metals and cleaning them.

If any slag remains at the waste metals, impurities may be added due to the slag during the recycling, whereby a good quality melting and recycling may be difficult. In this case, since it needs to additionally eliminate slag during the melting and recycling processes of the waste metals, a recycling efficiency may be greatly degraded. Different from the aforementioned method, the present invention makes it possible to separate the residual slag from the waste metals right after the slag have been taken off from the waste metals right before they are solidified again. For this reason, a quicker and better quality recycling can be carried out. In particular, since it is possible to take the residual slag off from the waste metals while rotating the taken-off waste metals and slag together, the cleaning effect of the waste metals can be greatly enhanced.

In the step S30, the waste metals can be separated from the slag using the magnetic force of the electromagnet, the waste metals can be more readily and quickly separated from the slag with the aid of the attachment and detachment of the waste metals since the electric current is turned on and off.

In the steps S10 and S30, any dusts may be collected by the dust collector 500, thus preventing in advance any air contamination, and any dust, for example, slag dust, etc. which may attach to the waste metals can be more reliably eliminated.

Meanwhile, in the step S30, the slag may be separated and recycled into a land reclamation material (a soil for land reclamation).

As illustrated in FIGS. 4 and 5, the apparatus for recycling waste raw materials according to the present invention may include, but is not limited to, a crusher 100 configured to accommodate waste raw materials mixed with slag and waste metals and adapted to take slag off from waste metals by applying impacts thereto, and a separator 400 adapted to separate the waste metals and slag which have been taken off by the crusher 100.

The slag can be quickly taken off from the waste metals by applying impacts to the waste raw materials by using the crusher 100, and then immediately the waste metals and slag are separated by the separator 400, whereupon the waste metals and slag can be produced in a quicker and easier way, thus greatly enhancing the recycling efficiency.

Figure 6A:
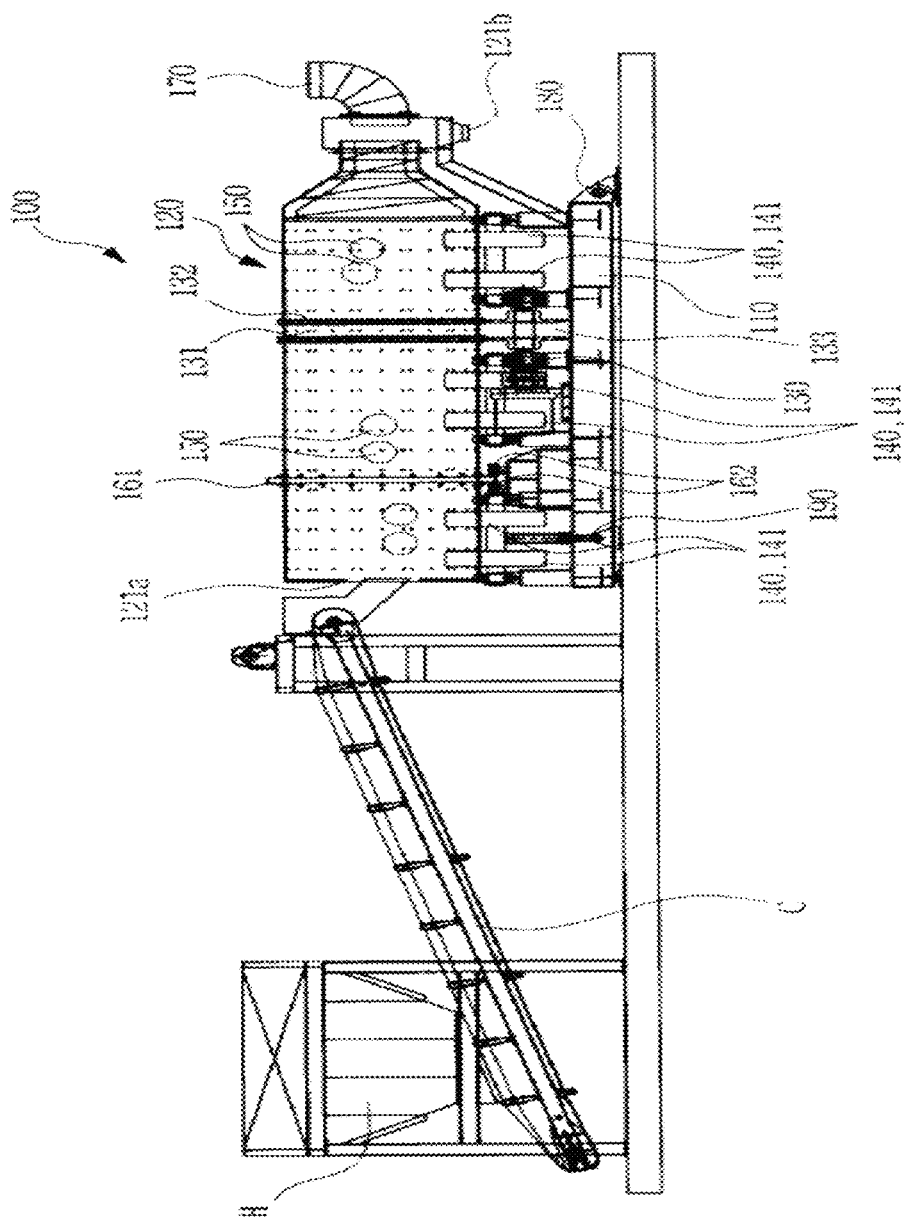
FIG. 6A is a front view illustrating a crusher which is adapted to an apparatus for recycling waste raw materials according to the present invention.
Figure 6B:
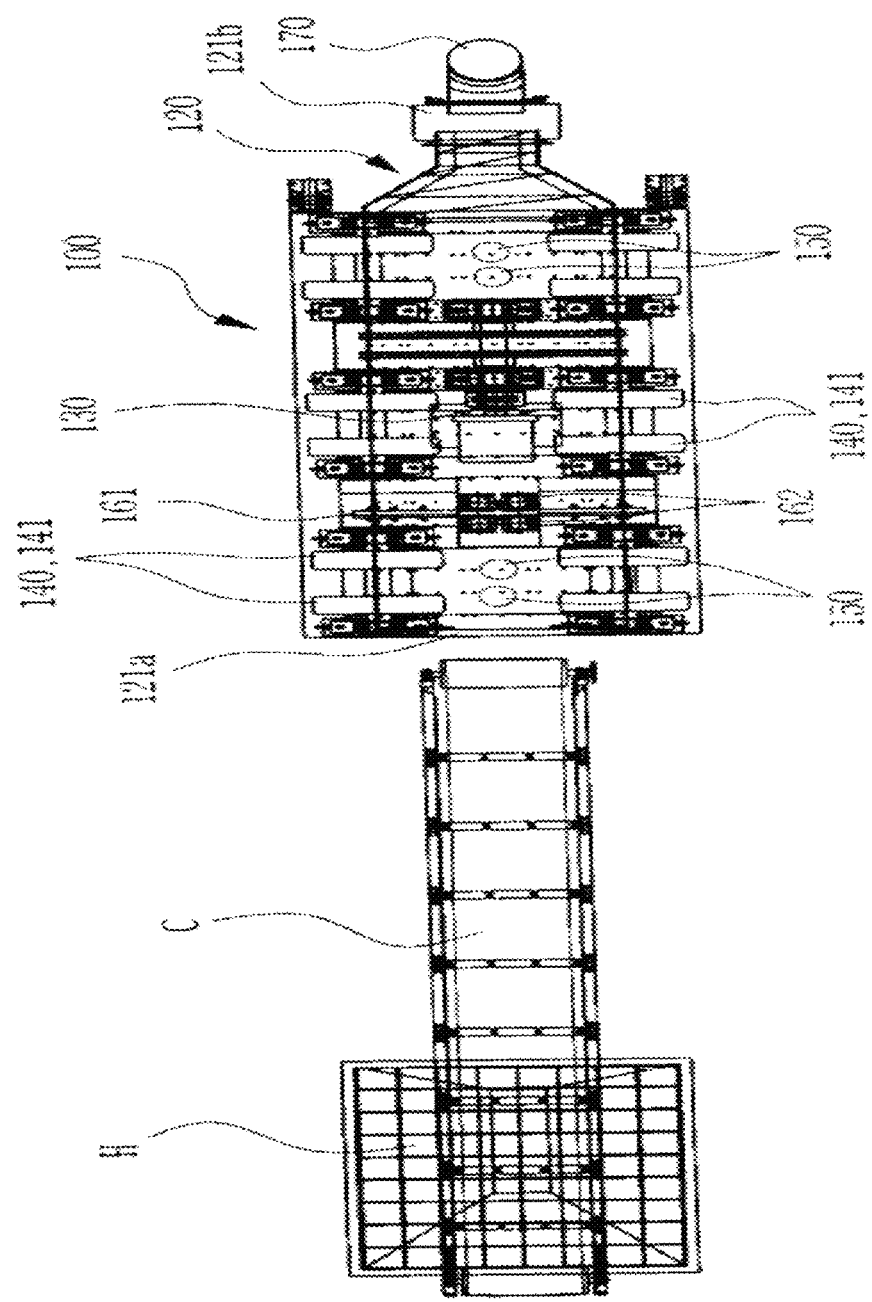
FIG. 6B is a plane view illustrating a crusher which is adapted to an apparatus for recycling waste raw materials according to the present invention.

FIG. 6A is a front view illustrating a crusher 100 which is adapted to an apparatus for recycling waste raw materials according to the present invention. FIG. 6B is a plane view illustrating a crusher 100 which is adapted to an apparatus for recycling waste raw materials according to the present invention. The waste raw materials are inputted into a waste raw material input hopper (H) and are moved up on a waste raw material conveyer (C) and are filled into the crusher 100 via a mouth 121a of the crushing drum 120.

As illustrated in FIGS. 6A and 6B, the crusher 100 adapted to the apparatus for recycling waste raw materials according to the present invention may include, but is not limited to, a base 110 installed on the ground, a crushing drum 120 which is formed of an inlet 121a and an outlet 121b configure to receive and discharge waste raw materials via them, a crushing motor 130 mounted on the base 110 and adapted to provide torque to the crushing drum 120, and a crushing support roller 140 adapted to support the crushing drum 120.

The slag can be taken off from the waste metals since the crushing drum 120 is rotated by the torque of the crushing motor 130 in a state where it is being supported by the crushing support roller 140, thus causing impacts to the waste raw materials, whereby the work can be quickly carried out, and a more reliable taking-off work can be carried out.

Since the steel balls 150 intended to cause impacts to the waste raw materials are filled in the crushing drum 120, stronger impacts can be applied to the waste raw materials, by means of which the taking-off operation between the waste metals and slag can be improved to the maximum.

Since the crushing support roller 140 is formed of a tire 141, any frictional force which might occur during the rotation of the crushing drum 120 can be minimized.

Meanwhile, it is preferred that the torque of the crushing motor 130 is designed to be transferred via a crushing sprocket 133 engaged to a crushing chain 132 engaged with crushing teeth 131 formed on the outer circumference of the crushing drum 120, whereby the transfer of the torque can be more readily carried out.

In the present invention, the crusher 100 may include, but is not limited to, a position control rim 161 fixed on the outer circumference of the crushing drum 120, and a position control roller 162 mounted on the base 110 and adapted to hold both sides of the position control rim 161.

Since any position deviations which might occur due to the concentrations of the waste raw materials at a predetermined position during the rotations of the crushing drum 120 can be compensated by the position control roller 162 and at both sides of the position control rim 161, which consequently makes it possible to carry out a safer taking-off work of the waste raw materials.

The crushing drum 120 may further include a crushing duct 170 which is configured to communicate with the dust collector 500 adapted to suck and collect any dusts produced from the waste raw materials, so any flying dusts can be collected by the dust collector 500, thus preventing in advance any air contamination, and any slag dusts which might attach on the waste metals can be more reliably eliminated.

The base 110 according to the present invention is engaged via a hinge 180 to the ground at the side of the outlet 121b of the crushing drum 120 and is configured to ascend or descend about the hinge 180 with the aid of a hydraulic cylinder 190 which is supported on the ground at the side of the inlet 121a of the crushing drum 120.

If the base 110 ascends about the hinge 180 with the aid of the hydraulic cylinder 190, an inclination by means of which the side to the inlet 121a of the crushing drum 120 is raised upward, is made, so the waste metals and slag can be quickly pushed toward the outlet 121b. In this case, such a configuration may be more useful since it can be adjusted depending on the work condition.

Figure 6C:
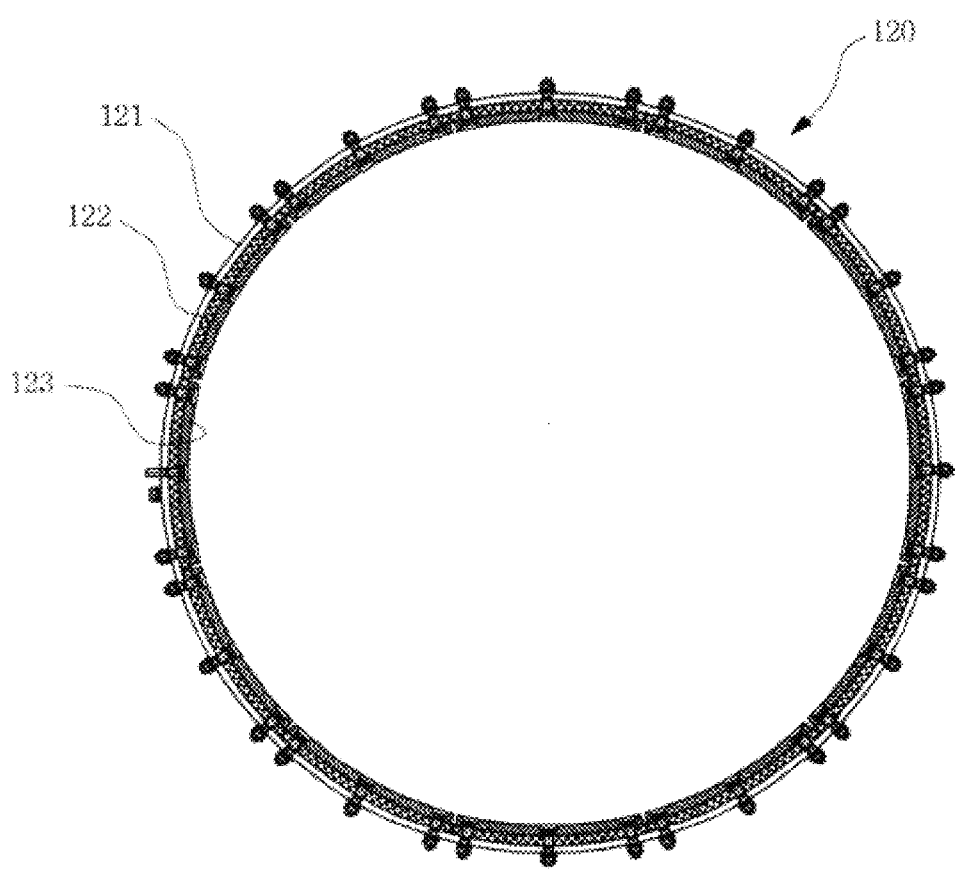
FIG. 6C is a cross sectional view illustrating a crushing drum which is adapted to an apparatus for recycling waste raw materials according to the present invention.

FIG. 6C is a cross sectional view illustrating a crushing drum 120 which is adapted to an apparatus for recycling waste raw materials according to the present invention.

As illustrated in FIG. 6C, the crushing drum 120 adapted to the present invention may include, but is not limited to, a cylindrical body 121 which is equipped with an inlet 121a and an outlet 121b, a cushioning plate 122 assembled to an inner side of the cylindrical body 121, and an abrasion resistant steel plate 123 which is assembled to an inner side of the cushioning plate 122 and is able to cause impacts to the waste raw materials.

The cylindrical body 121 may maintain the whole frame, and the abrasion resistant steel plate 123 is assembled in a hexagonal piece shape, thus resisting against any friction with the waste raw materials, and the cushioning plate 122 is adapted to ensure a designed service life in such a way to minimize any impact effects from the abrasion resistant steel plate 123 to the cylindrical body 121.

Figure 7A:
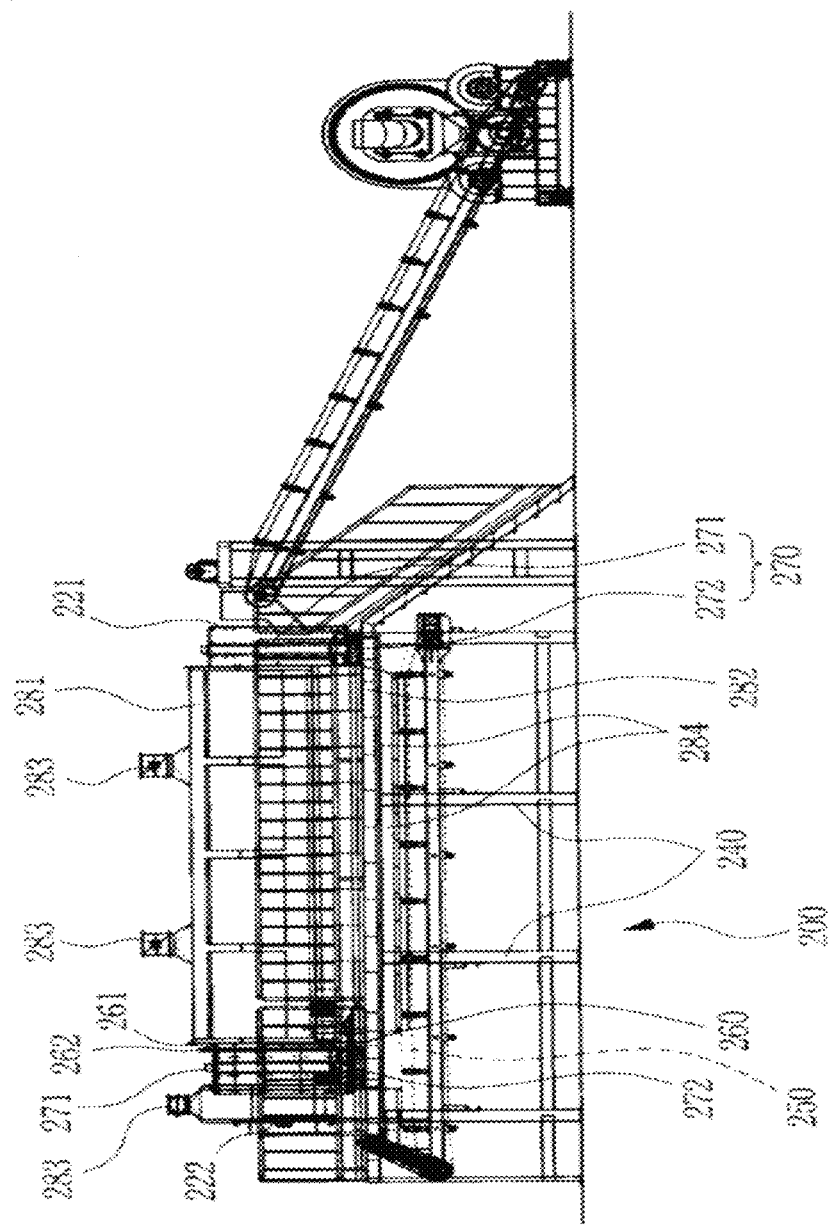
FIG. 7A is a front view illustrating a cleaner which is adapted to an apparatus for recycling waste raw materials according to the present invention.
Figure 7B:
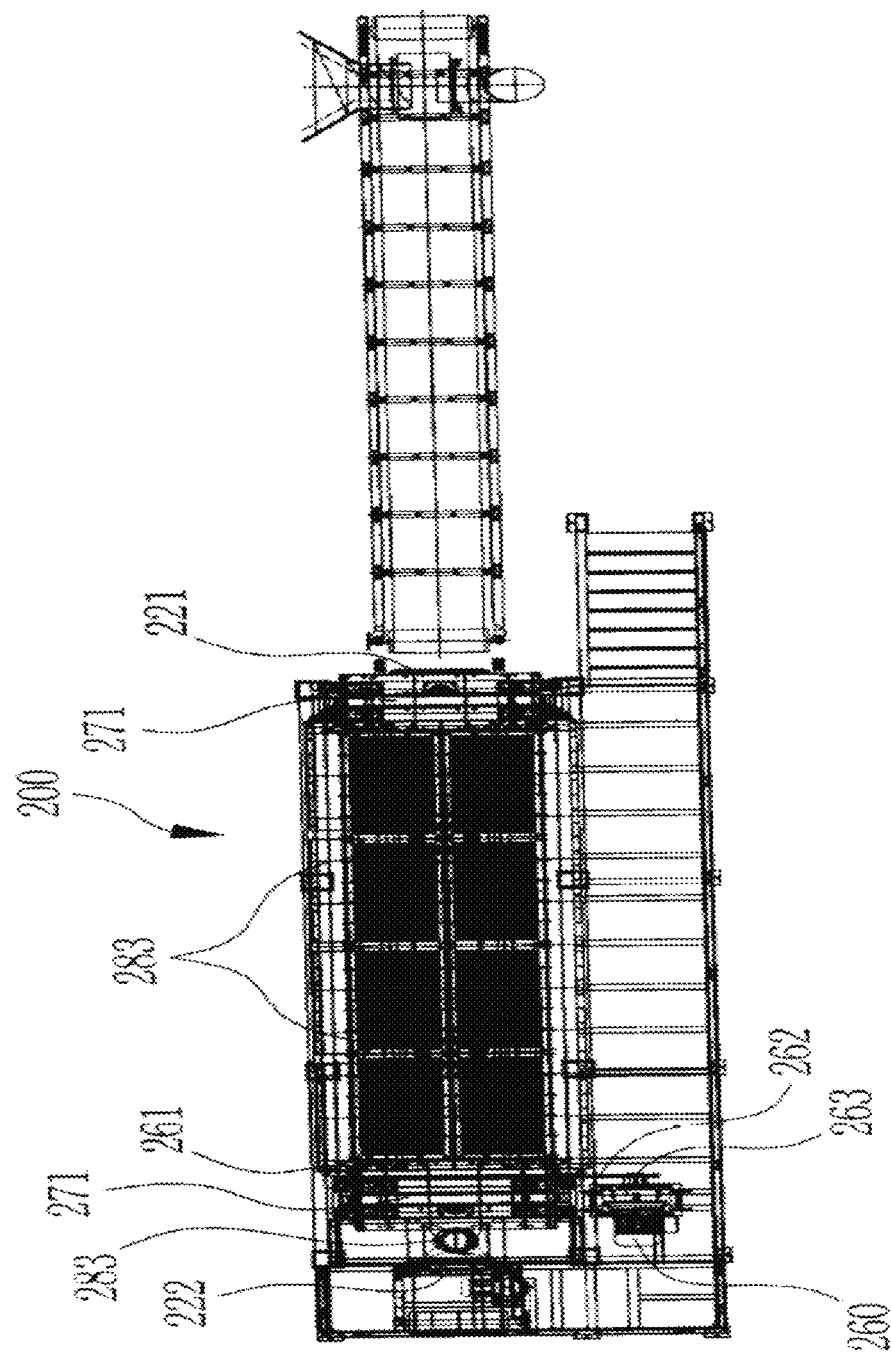
FIG. 7B is a plane view illustrating a cleaner which is adapted to an apparatus for recycling waste raw materials according to the present invention.
Figure 7C:
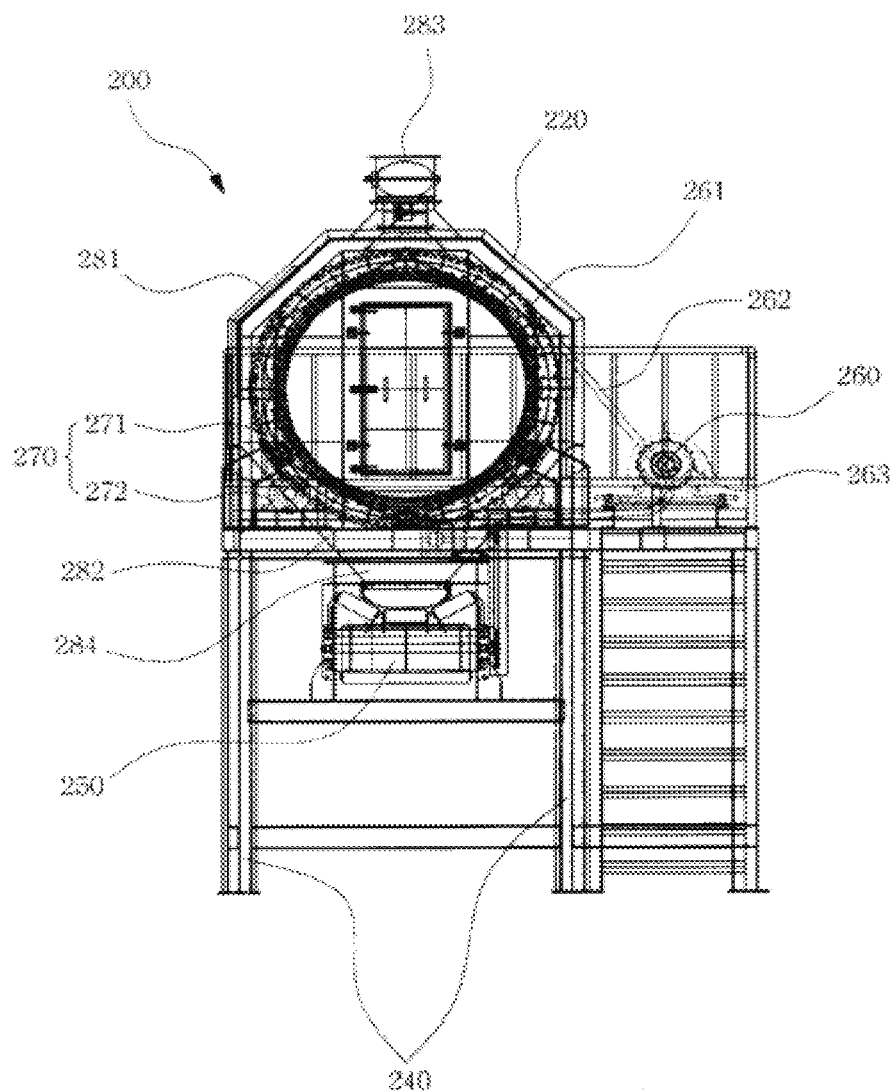
FIG. 7C is a lateral view illustrating a cleaner which is adapted to an apparatus for recycling waste raw materials according to the present invention.

FIG. 7A is a front view illustrating a cleaner 200 which is adapted to an apparatus for recycling waste raw materials according to the present invention. FIG. 7B is a plane view illustrating a cleaner 200 which is adapted to an apparatus for recycling waste raw materials according to the present invention. FIG. 7C is a lateral view illustrating a cleaner 200 which is adapted to an apparatus for recycling waste raw materials according to the present invention.

As illustrated in FIGS. 4 and 5 and FIGS. 7A to 7C, the apparatus for recycling waste raw materials according to the present invention may further include a cleaner 200 which is able to clean the residual slag on the waste metals while rotating the waste metals and slag which have been taken off by the crusher 100 and is able to transfer them to the separator 400 via the transfer conveyer 210.

Since the cleaner 200 is able to take the residual slag off from the waste metals immediately before the slag and the waste metals are solidified together after they have been separated, the cleaning effects of the waste metals, namely, the slag eliminating effects can be greatly improved.

Figure 7D:
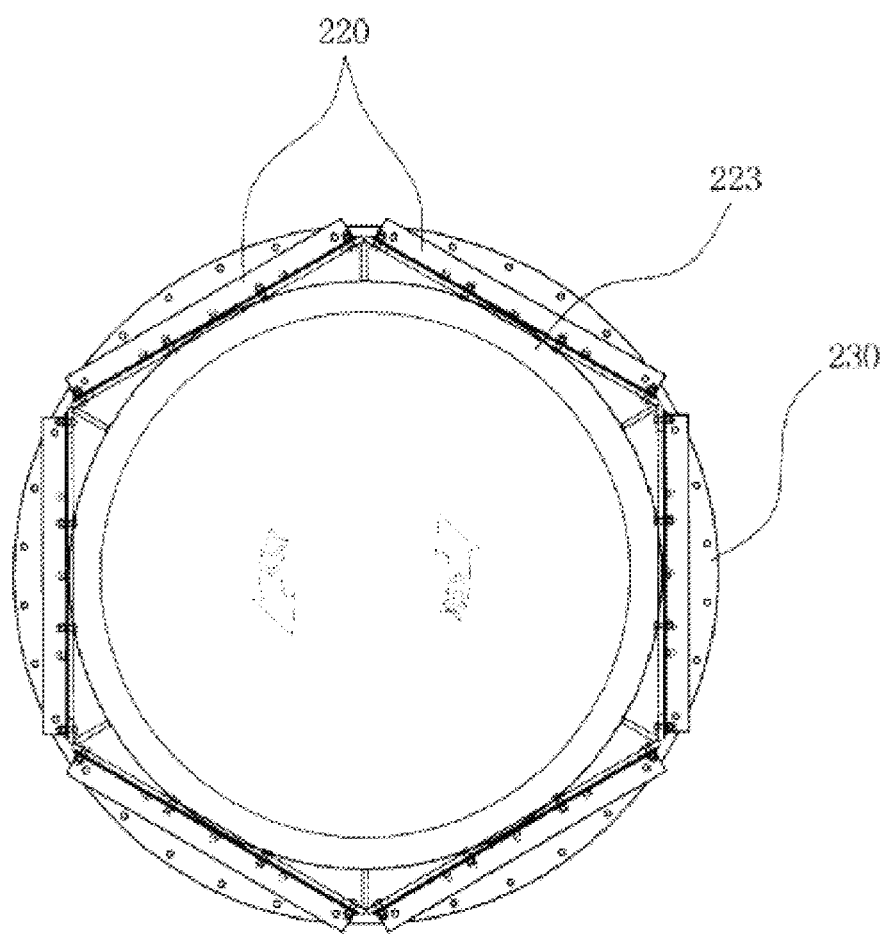
FIG. 7D is a cross sectional view illustrating a porous cleaning drum and a cylindrical porous cleaning case which are intended to define the configuration of a cleaner which is adapted to an apparatus for recycling waste raw materials according to the present invention.
Figure 7E:
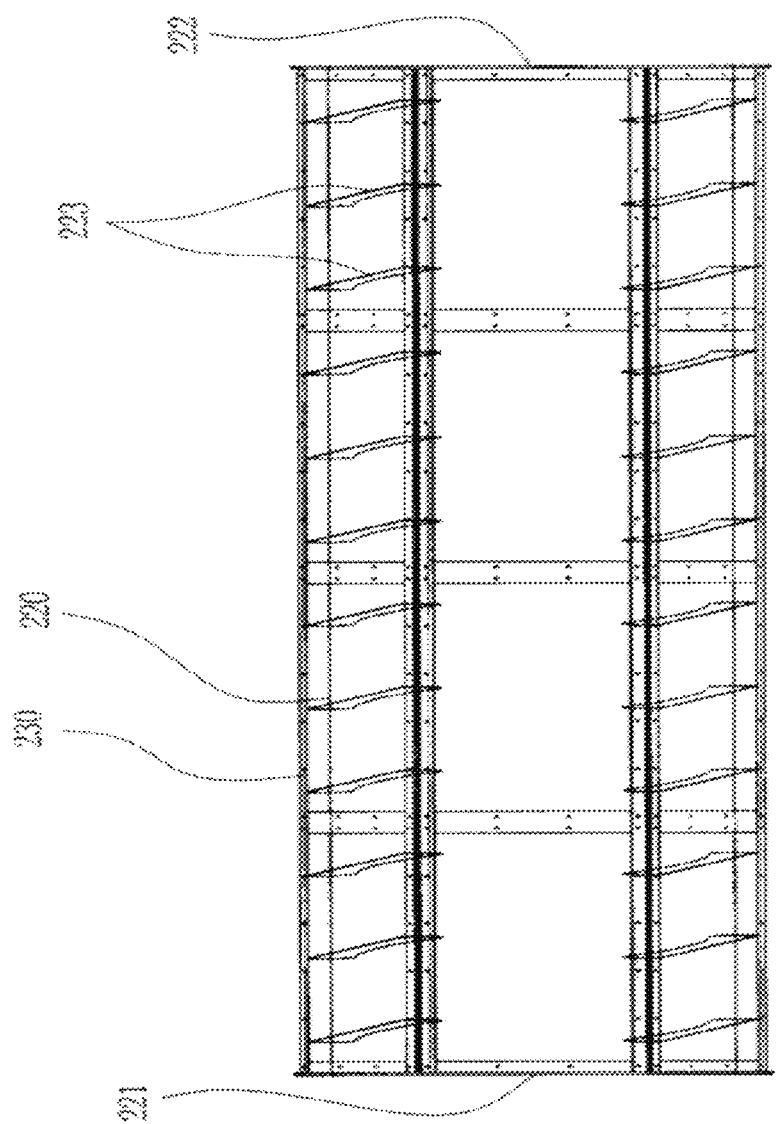
FIG. 7E is a front view illustrating a porous cleaning drum and a cylindrical cleaning case which are intended to define the configuration of a cleaner which is adapted to an apparatus for recycling waste raw materials according to the present invention.

FIG. 7D is a cross sectional view illustrating a porous cleaning drum 220 and a cylindrical porous cleaning case 230 which are intended to define the configuration of a cleaner 200 which is adapted to an apparatus for recycling waste raw materials according to the present invention. FIG. 7E is a front view illustrating a porous cleaning drum 220 and a cylindrical cleaning case 230 which are intended to define the configuration of a cleaner 200 which is adapted to an apparatus for recycling waste raw materials according to the present invention.

As illustrated in FIGS. 7A to 7E, the cleaner 200 according to the present invention may include, but is not limited to, a porous cleaning drum 220 which is equipped with an INPUT 221 and an OUTPUT 222 configured to receive and discharge the waste metals and slag together which have been taken off from each other by the crusher 100 and drop small-particles and discharge large-particles via the OUTPUT 222 by cleaning the residual slag on the waste metals while rotating, a supporter 240 which is equipped with a drop conveyer 250 adapted to guide the waste metals and slag which have been dropped and discharged from the porous cleaning drum 220, to drop onto the transfer conveyer 210, a cleaning motor 260 adapted to provide torque to the porous cleaning drum 220, and a cleaning support roller 270 which is mounted on the supporter 240 and is able to support the porous cleaning drum 220.

Since the porous cleaning drum 220 can clean the residual slag off the waste metals and let the micro particles drop downward and the large-particles to be discharged via the OUTPUT 222, it is possible to prevent in advance any potential problem which might occur if the cleaning is unavailable in case where the waste metals are covered with the micro particles.

The porous cleaning drum 220 is made in a polygonal shape, whereby the impacts caused to the waste metals and slag can be maximized during the rotations thereof.

The cylindrical porous cleaning case 230 may be further engaged to the outer circumference of the porous cleaning drum 220 since the residual slag won't take off well in case of the waste metals and slag of micro particles. The micro particles taken off from the porous cleaning drum 220 may repeatedly collide inside the cylindrical porous cleaning case 230, whereby the residual slag can be taken off again from the waste metals of micro particles, so the cleaning effects of the waste metals can be greatly improved.

Figure 7F:
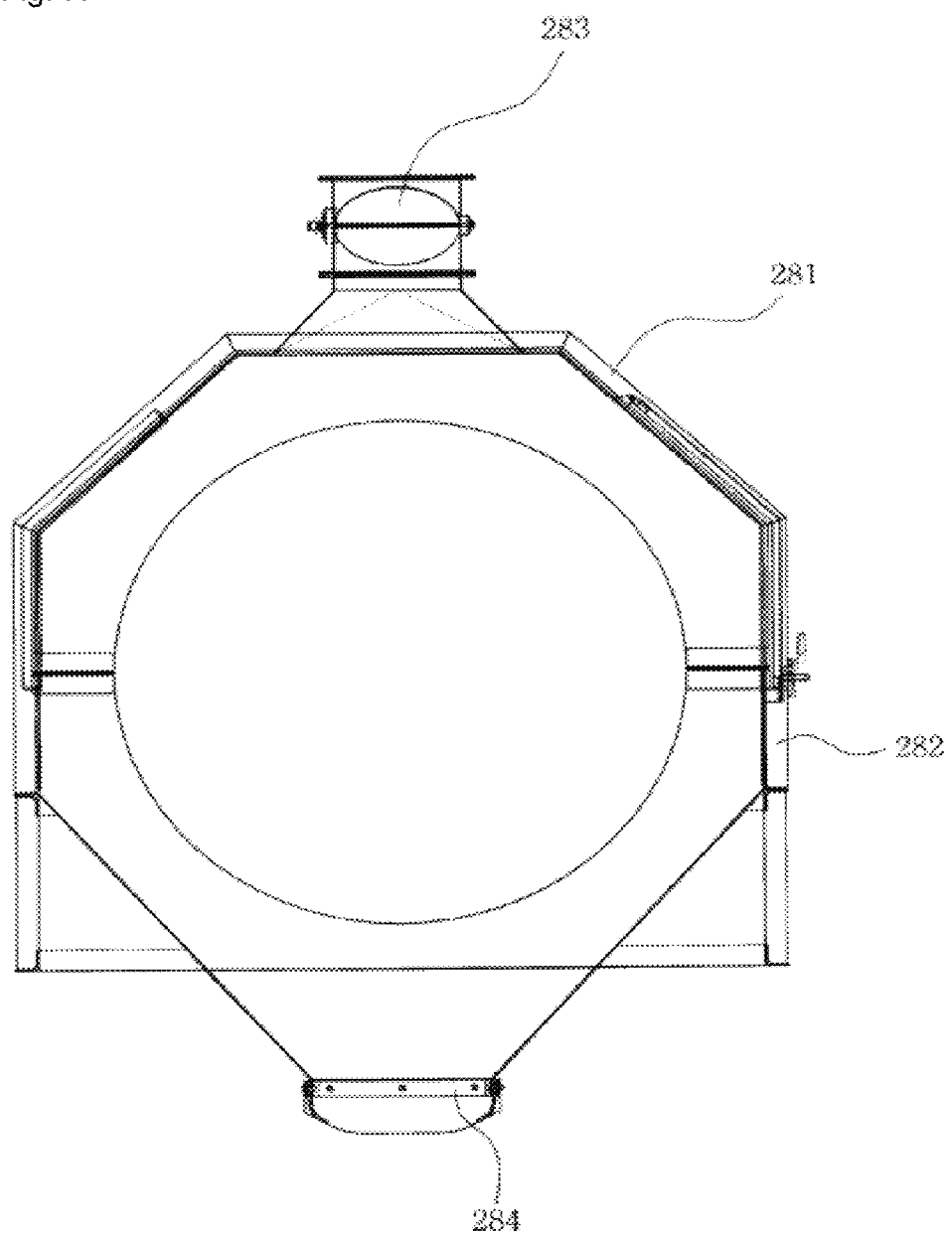
FIG. 7F is a lateral view illustrating an upper cleaning housing and a lower cleaning housing which are intended to define the configuration of a cleaner which is adapted to an apparatus for recycling waste raw materials according to the present invention.

FIG. 7F is a lateral view illustrating an upper cleaning housing 281 and a lower cleaning housing 282 which are intended to define the configuration of a cleaner 200 which is adapted to an apparatus for recycling waste raw materials according to the present invention.

As illustrated in FIG. 7F, there are further provided an upper cleaning housing 281 and a lower cleaning housing 282 which are fixed at the supporter 240 and are disposed covering the outer circumference of the cylindrical porous cleaning case 230, thus protecting the porous cleaning drum 220 and the porous cleaning case 230.

The upper cleaning housing 281 may further include a cleaning duct 283 which can communicate with the dust collector 500 provided to suck and collect the dust generating from the waste metals and slag, and the lower cleaning housing 282 may further include a cleaning hopper 284 disposed toward the drop conveyer 250.

Moreover, a cleaning blade 223 may be engaged at an inner side of the porous cleaning drum 220 and may be formed spiral from the INPUT 221 to the OUTPUT 222, thus the waste metals and slag can be pushed from the INPUT 221 to the OUTPUT 222 during the rotations thereof.

The torque of the cleaning motor 260 may be transferred via the cleaning sprocket 263 engaged to the cleaning chain 262 engaged with the cleaning teeth 261 formed at the outer circumference of the porous cleaning drum 220, by means of which the transfer of the torque can be more readily carried out.

Moreover, the cleaning support roller 270 may be formed of a steel roller 272 contacting with the tire ring 271 provided at the outer circumference of the porous cleaning drum 220, whereupon the porous cleaning drum 220 can rotate more smoothly.

Figure 8A:
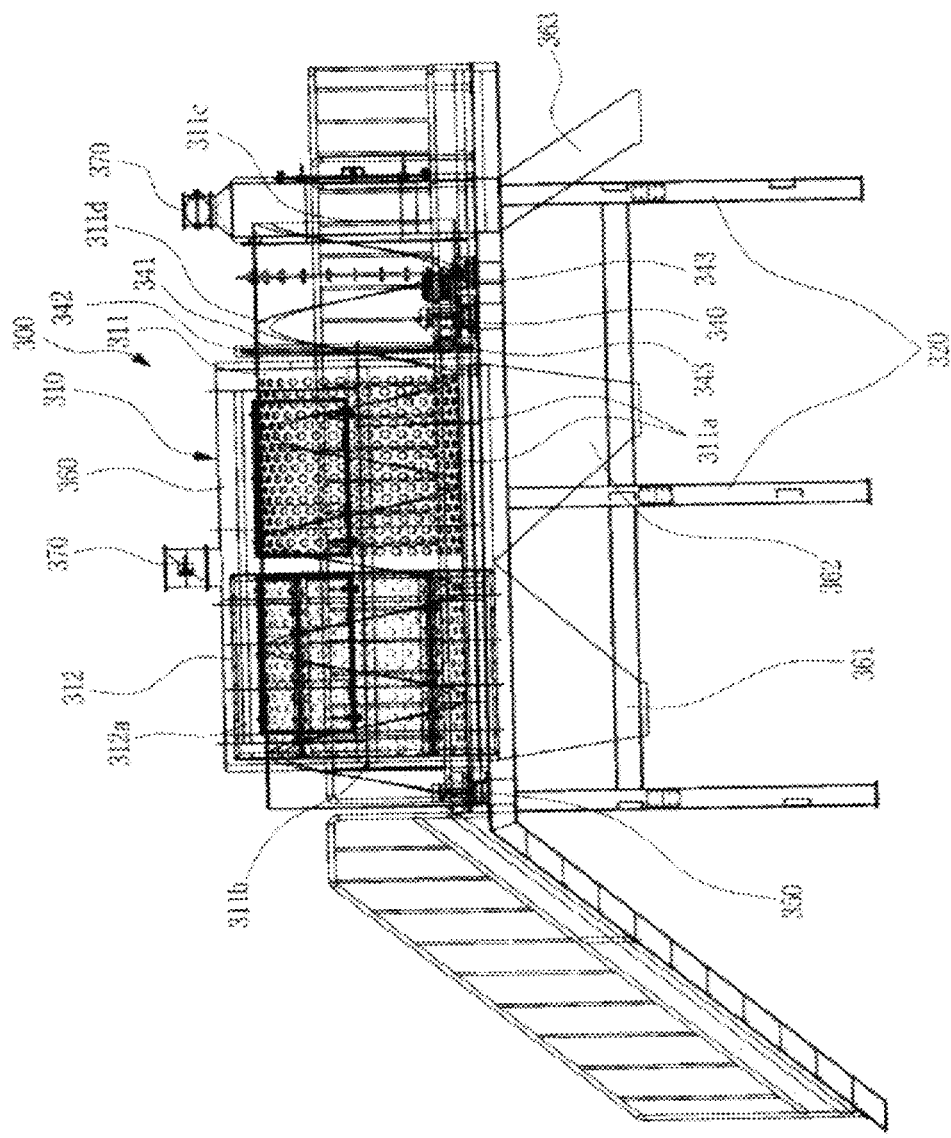
FIG. 8A is a front view illustrating a sorter which is adapted to an apparatus for recycling waste raw materials according to the present invention.
Figure 8B:
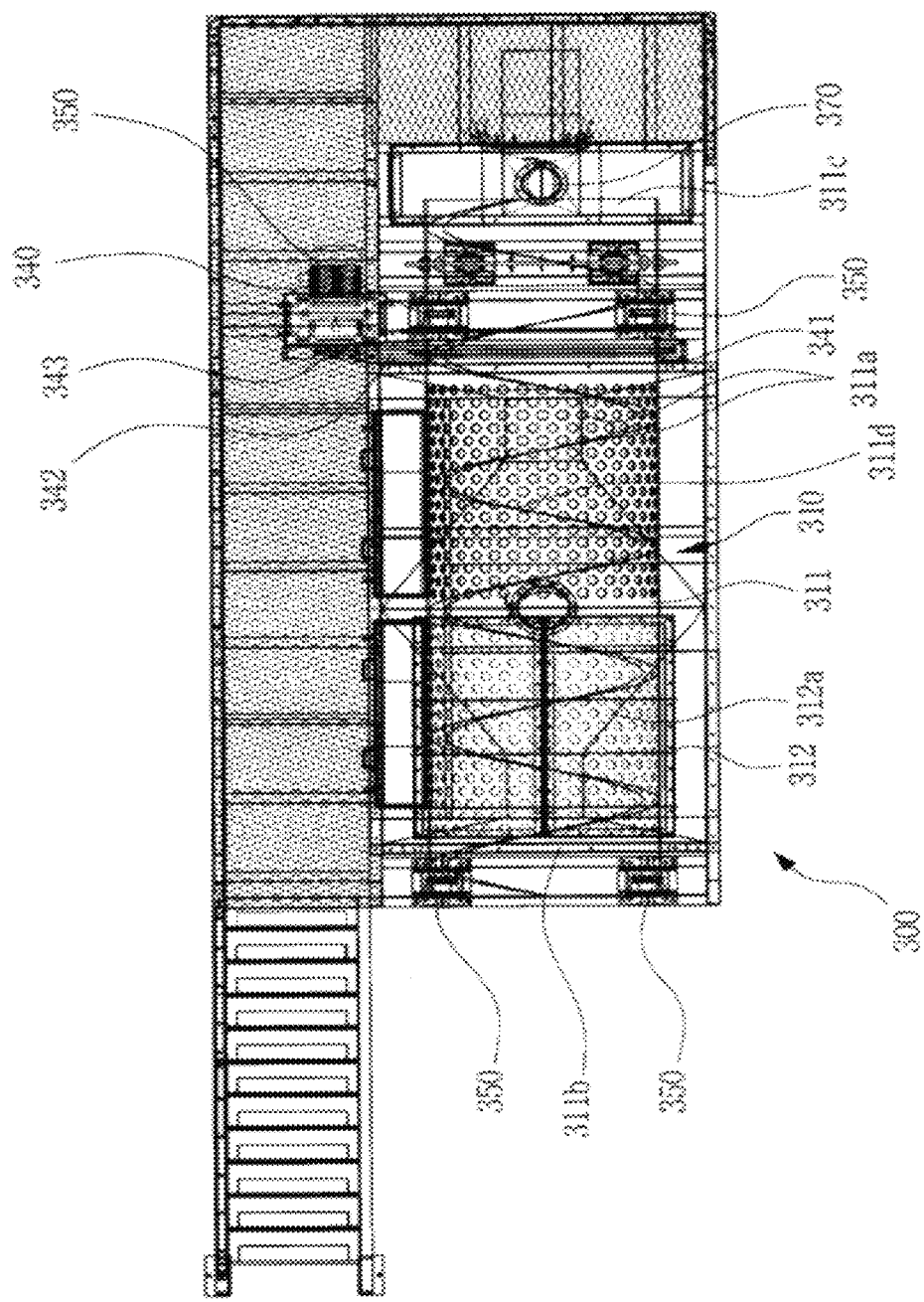
FIG. 8B is a plane view illustrating a sorter which is adapted to an apparatus for recycling waste raw materials according to the present invention.
Figure 8C:
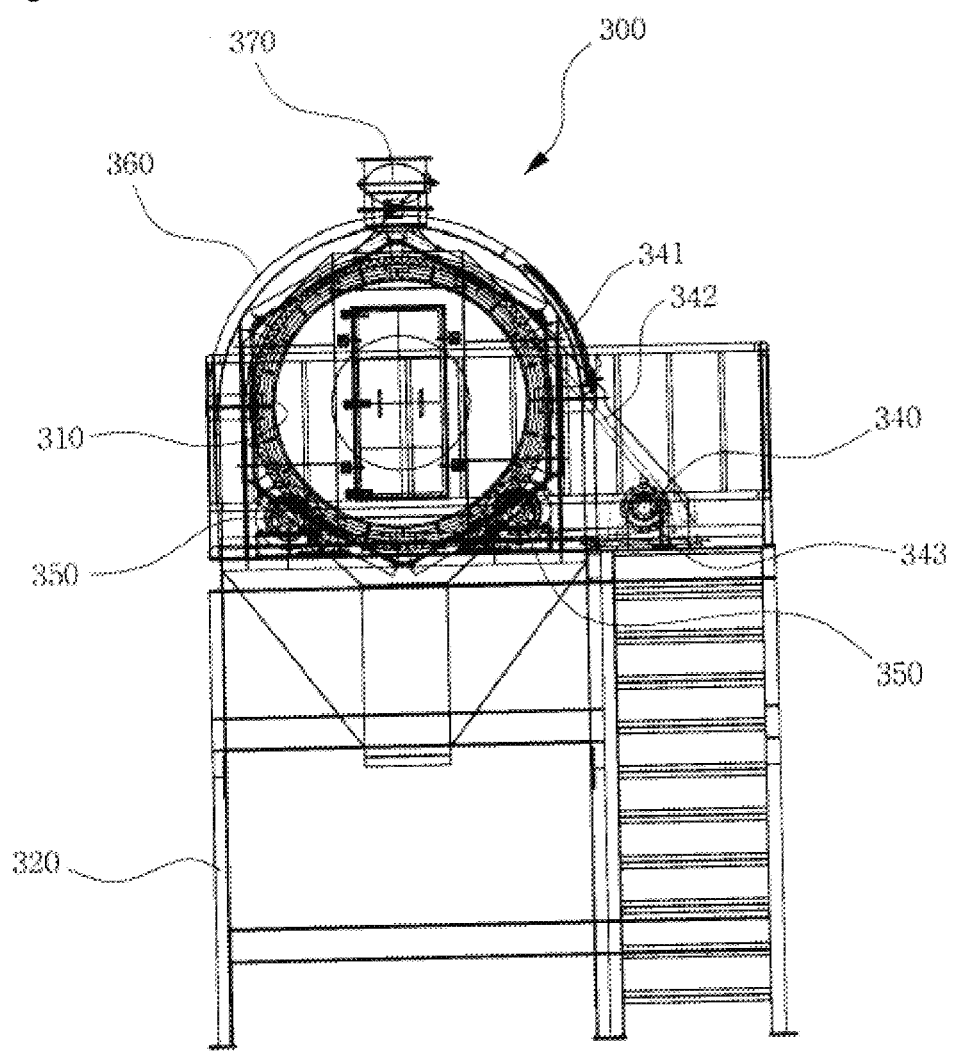
FIG. 8C is a lateral view illustrating a sorter which is adapted to an apparatus for recycling waste raw materials according to the present invention.

FIG. 8A is a front view illustrating a sorter 300 which is adapted to an apparatus for recycling waste raw materials according to the present invention. FIG. 8B is a plane view illustrating a sorter 300 which is adapted to an apparatus for recycling waste raw materials according to the present invention. FIG. 8C is a lateral view illustrating a sorter 300 which is adapted to an apparatus for recycling waste raw materials according to the present invention.

As illustrated in FIGS. 4 and 5 and FIGS. 8A to 8C, the apparatus for recycling waste raw materials according to the present invention may further include a sorter 300 which is able to sort out the waste metals and slag, which have passed through the cleaner 200, by size and transfer to a separator 400.

The waste raw materials are previously prepared, and the impacts are applied to the waste raw materials using the crusher 100, and then immediately the slag is taken off from the waste metals, and the waste metals and slag are sorted out by the sorter 300, so it is possible to establish an easier recycling foundation for the waste metals and slag, thus maximizing the recycling efficiency.

Figure 8D:
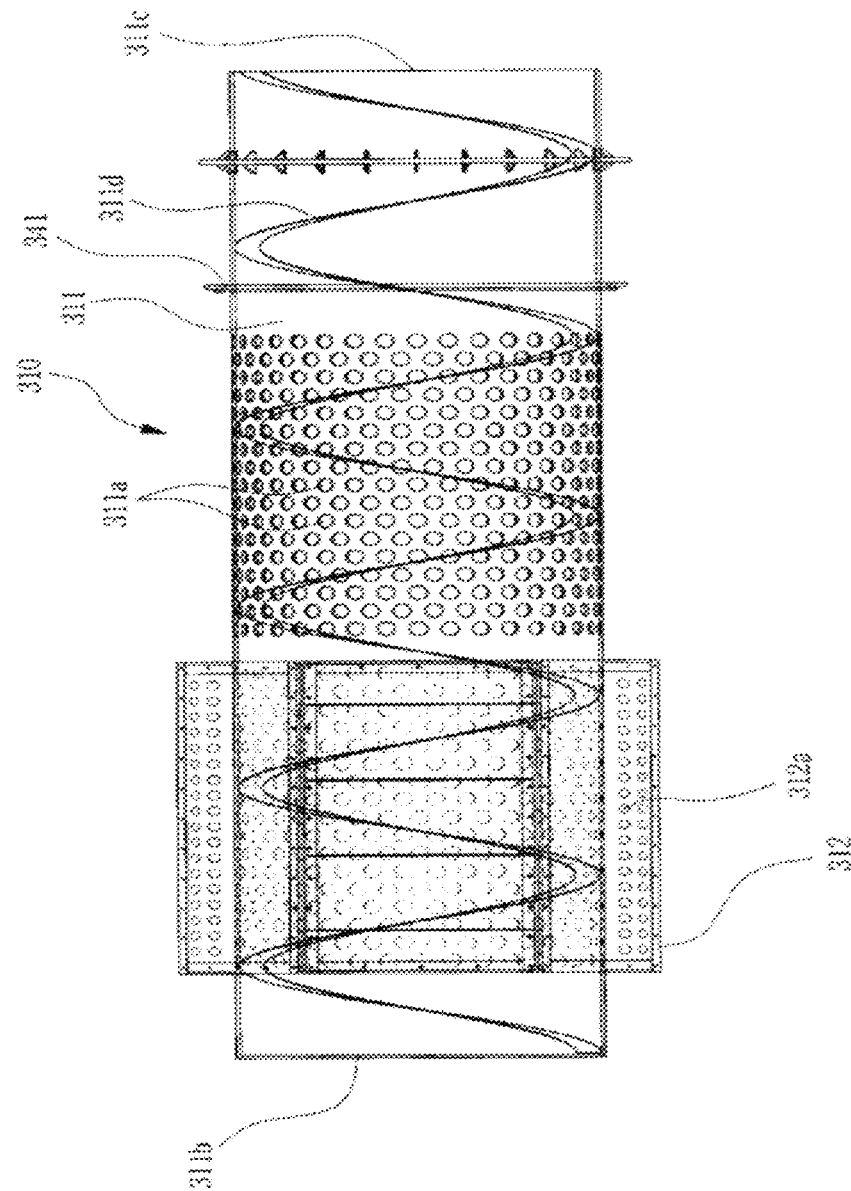
FIG. 8D is a front view illustrating a porous sorting drum and an entrance polygonal sorting drum which are adapted to a sorter of an apparatus for recycling waste raw materials according to the present invention.
Figure 8E:
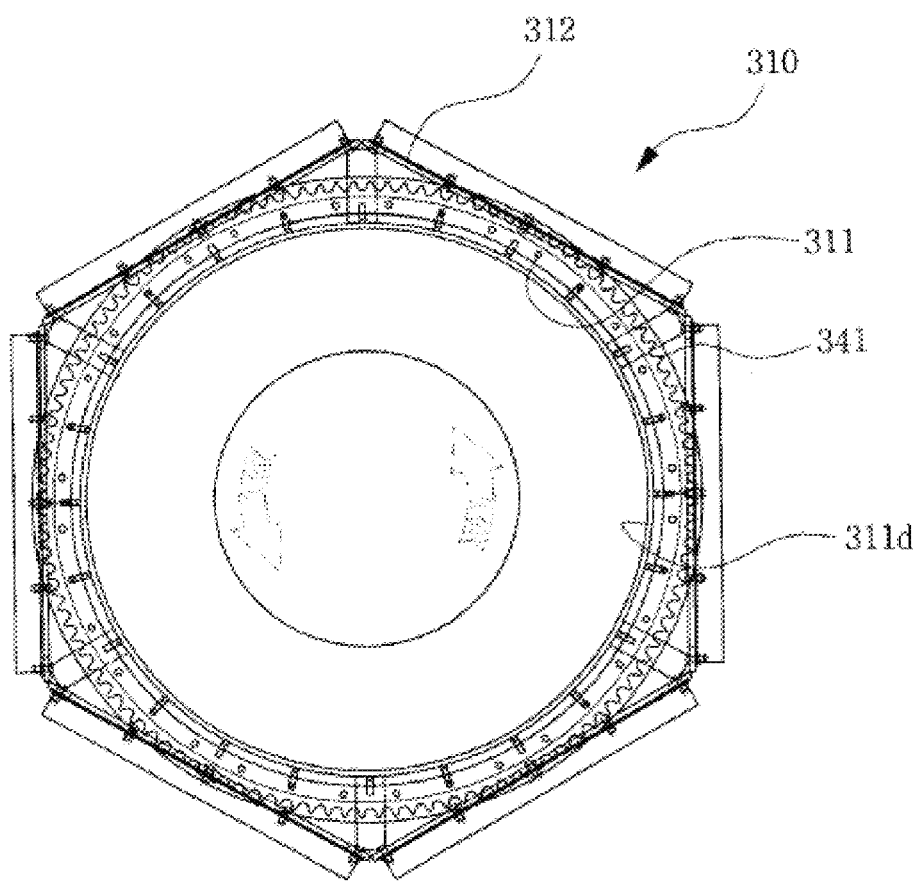
FIG. 8E is a lateral view illustrating a porous sorting drum and an entrance polygonal sorting drum which are adapted to a sorter of an apparatus for recycling waste raw materials according to the present invention.
Figure 8F:
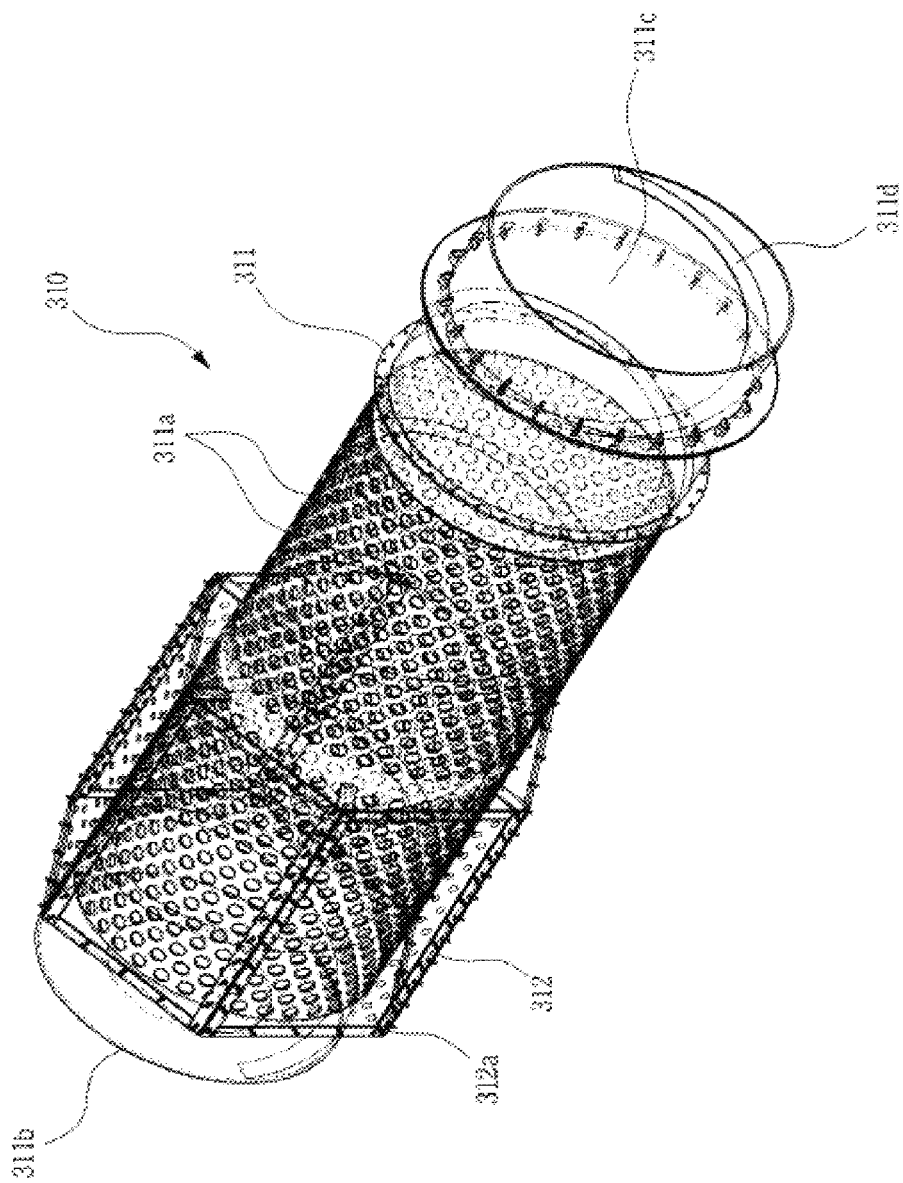
FIG. 8F is a disassembled perspective view illustrating a porous sorting drum and an entrance sorting drum which are adapted to a sorter of an apparatus for recycling waste raw materials according to the present invention.

FIG. 8D is a front view illustrating a porous sorting drum 310 and an entrance polygonal sorting drum 312 which are adapted to a sorter 300 of an apparatus for recycling waste raw materials according to the present invention. FIG. 8E is a lateral view illustrating a porous sorting drum 310 and an entrance polygonal sorting drum 312 which are adapted to a sorter 300 of an apparatus for recycling waste raw materials according to the present invention. FIG. 8F is a disassembled perspective view illustrating a porous sorting drum 310 and an entrance polygonal sorting drum 312 which are adapted to a sorter 300 of an apparatus for recycling waste raw materials according to the present invention.

As illustrated in FIGS. 4 and 5 and FIGS. 8A to 8F, the sorter 300 according to the present invention may include, but is not limited to, a porous sorting drum 310 adapted to receive the waste metals and slag transferred from the transfer conveyer 210 and sort out them into a small-particle, a medium-particle and a large-particle and equipped with an inlet 311b and an outlet 311c configured to drop and discharge the sorted-out particles, a small-particle conveyer 331 adapted to receive the waste metals and slag of the small-particle, the medium-particle and the large-particle which are dropping and discharged from the porous sorting drum 310, a frame 320 equipped with a medium-particle conveyer 332 and a large-particle conveyer 333, a sorting motor 340 which is mounted on the frame 320 and is able to provide torque to the porous sorting drum 310, and a sorting support roller 350 which is mounted on the frame 320 and is adapted to support the porous sorting drum 310.

The waste metals may be recycled after sorting out them into a small-particle (for example, below 7 mm), a medium-particle (for example, 7~75 mm), and a large-particle (for example, over 75 mm), so the waste metals can be usefully recycled by size when melting and recycling them.

The porous sorting drum 310 may include, but is not limited to, a porous central sorting drum 311 which is equipped with an inlet 311b and a discharge port 311c and a medium-particle hole 311a, and an entrance polygonal sorting drum 312 which is disposed covering from the inlet 311b to an intermediate position of the porous sorting drum 310 and is equipped with the small-particle holes 312a. The waste metals and slag of small-particles may pass through the porous central sorting drum 311 and may drop into the small-particle conveyer 331 via the entrance polygonal sorting drum 312, and the waste metals and slag of medium-particles may pass through the porous central sorting drum 311 and may drop onto the medium-particle conveyer 332 or may be filtered by the entrance polygonal sorting drum 312 and the may drop onto the medium-particle conveyer 332, and the waste metals and slag of large-particles may drop onto the large-particle conveyer via the discharge port 311c.

The porous central sorting drum 311 can be readily manufactured so as to sort out by size the waste metals into a small-particle (for example, below 7 mm), a medium-particle (for example, 7~75 mm) and a large-particle (for example, over 75 mm), and the entrance polygonal sorting drum 312 is provided, which is disposed covering from the inlet 311b to an intermediate portion of the porous sorting drum 310 and is equipped with the small-particle holes 312a, by means of which the manufacturing of the facility can become much easier.

The waste metals and slag of small-particles may pass through the porous central sorting drum 311 and may drop onto the small-particle conveyer 331 via the entrance polygonal sorting drum 312, and the waste metals and slag of medium-particles may pass through the porous central sorting drum 311 and may drop onto the medium-particle conveyer 332 or may be filtered by the entrance polygonal sorting drum 312 and then may drop onto the medium-particle conveyer 332, and the waste metals and slag of large-particles may drop onto the large-particle conveyer 333 via the discharge port 311c, whereby the waste metals and slag can be readily sorted out by size.

The sorter 300 may preferably include a sorting housing 360 which is fixed at the frame 320 and is disposed covering the outer circumference of the porous sorting drum 310, and the sorting housing 360 may include a small-particle hopper 361 disposed toward the small-particle conveyer 331, a medium-particle hopper 362 disposed toward the medium-particle conveyer 332, and a large-particle hopper 363 disposed toward the large-particle conveyer 333, by means of which the particle size sorting can be more reliably carried out.

The sorting housing 360 may further include a sorting duct 370 which can communicate with the dust collector 500 which is able to suck and collect the dusts which are produced from the waste metals and slag, whereby the cleaning of the waste metals can be improved while preventing the dust from flying over.

A sorting blade 311d may be provided at an inner side of the porous central sorting drum 311 and may be formed spiral from the inlet 311b toward the discharge port 311c, whereupon the waste metals and slag can be quickly discharged from the inlet 311b to the discharge port 311c.

It is preferred to readily transfer the torque in such a way that the torque of the sorting motor 340 is transferred via the sorting sprocket 343 engaged to the sorting chain 342 engaged with the sorting teeth 341 formed at the outer circumference of the porous central sorting drum 311.

Moreover, the cleaning support roller 270 may be equipped with the steel roller 272 which is contacting with the tire ring 271 provided at the outer circumference of the porous cleaning drum 220, by which the porous cleaning drum 220 can be more smoothly rotated.

As illustrated in FIGS. 4 and 5, the separator 400 adapted to the apparatus for recycling waste raw materials according to the present invention may allow to quickly and readily separate the waste metals from the slag with the aid of magnetic force.

More specifically, the separator 400 may include, but is not limited to, a small-particle waste metal conveyer 411, a medium-particle waste metal conveyer 412 and a large-particle waste metal conveyer 413 which are disposed in parallel at the small-particle conveyer 331, the medium-particle conveyer 332, and the large-particle conveyer 333, a slag conveyer 414 which is disposed in a direction orthogonal to the lower side of an end portion of each of the small-particle conveyer 331, the medium-particle conveyer 332 and the large-particle conveyer 333 and is able to transfer slag, a small-particle electromagnetic module 421 which is disposed at the top of the small-particle conveyer 331 and is able to separate the waste metals from the slag with the aid of magnetic force and drop them onto the small-particle waste metal conveyer 411, a medium-particle electromagnetic module 422 which is disposed at the top of the medium-particle conveyer 332 and is able to separate the waste metals from the slag with the aid of magnetic force and drop them onto the medium-particle waste metal conveyer 412, and a large-particle electromagnetic module 423 which is disposed at the top of the large-particle conveyer 333 and is able to separate the waste metals from the slag with the aid of magnetic force and drop them onto the large-particle waste metal conveyer 413.

The small-particle waste metal conveyer 411, the medium-particle waste metal conveyer 412 and the large-particle waste metal conveyer 413 are disposed in parallel at the small-particle conveyer 331, the medium-particle conveyer 332, and the large-particle conveyer 333, whereby the waste metals can be quickly transferred by size, and the slag conveyer 414 is disposed in a direction orthogonal to the lower side of an end portion of each of the small-particle conveyer 331, the medium-particle conveyer 332 and the large-particle conveyer 333, respectively, thus transferring the slag at a time, and the waste metals can be sorted out by size from the slag with the aid of the small-particle electromagnetic module 421 (the magnetic force can be controlled with the on and off of the current), the medium-particle electromagnetic module 422 (the magnetic force can be controlled with the on and off of the current), and the large-particle electromagnetic module 423 (the magnetic force can be controlled with the on and off of the current), whereby the work can be carried quicker.

The small-particle waste metals transferred via the small-particle waste metal conveyer 411, the medium-particle waste metals transferred via the medium-particle waste metal conveyer 412, and the large-particle waste metals transferred via the large-particle waste metal conveyer 413 can be melted by size and recycled by the method and apparatus for recycling waste raw materials according to the present invention, and the slag transferred via the slag conveyer 414 can be recycled into a land reclamation material. For this reason, the present invention may contribute to a resource recycling while preventing in advance any environment contamination.

INDUSTRIAL APPLICABILITY

The present invention can be used for a resource recycling-related industry wherein waste metals and slag produced from an iron and steel or a steel manufacturing facility as well as metallic chips contained in an industrial waste are intended to be recycled.

The invention claimed is:
1. An apparatus for recycling waste raw materials, comprising:
  a crusher, wherein the crusher accommodates waste raw materials mixed with slag and waste metals and takes the slag off from the waste metals;
  a separator, wherein the separator separates the waste metals and slag which have been taken off by the crusher; and
  a cleaner,
  wherein,
  the crusher comprises:
  a base which is installed on the ground;
  a crushing drum which is formed of an inlet and an outlet configured to receive and discharge the waste raw materials and is able to generate impacts during the rotations thereof;
  a crushing motor which is mounted on the base and is adapted to provide torque to the crushing drum; and
  a crushing support roller which is mounted on the base and is able to support the crushing drum,
  the cleaner cleans residual slag on the waste metals while rotating the waste metals and slag which have been taken off by the crusher, and transfers the residual slag to the separator via a transfer conveyer, and
  the cleaner comprises:
  a porous cleaning drum, wherein the porous cleaning drum is equipped with an INPUT and an OUTPUT which are configured to receive and discharge the waste metals and slag together which have been taken off from each other by the crusher, respectively, and to drop or discharge via the OUTPUT by cleaning the residual slag on the waste metals while rotating;
  a supporter, wherein the supporter is equipped with a drop conveyer adapted to guide the waste metals and slag which have been dropped and discharged from the porous cleaning drum and to drop onto the transfer conveyer;
  a cleaning motor, wherein the cleaning motor is configured to provide torque to the porous cleaning drum; and
  a cleaning support roller, wherein the cleaning support roller is mounted on the supporter and is being capable of supporting the porous cleaning drum.
2. The apparatus of claim 1, further comprising: a plurality of steel balls which are inserted inside the crushing drum so as to cause impacts to the waste raw materials.
3. The apparatus of claim 1, wherein the crushing support roller is a tire.

4. The apparatus of claim 1, wherein the torque of the crushing motor is transferred via a crushing sprocket engaged to a crushing chain engaged with crushing teeth formed at an outer circumference of the crushing drum.

5. The apparatus of claim 1, further comprising: a position control rim fixed at an outer circumference of the crushing drum; and a position control roller which is mounted on the base and is adapted to hold both sides of the position control rim.

6. The apparatus of claim 1, further comprising: a crushing duct which communicates with a dust collector which is adapted to suck and collect dusts which generate from the waste raw materials.

7. The apparatus of claim 1, wherein the base is engaged about a hinge at the ground at the side to the outlet of the crushing drum and is configured to ascend or descend about the hinge with the aid of a hydraulic cylinder supported on the ground at the side to the inlet of the crushing drum.

8. The apparatus of claim 1, wherein the crushing drum comprises: a cylindrical body which is formed of the inlet and the outlet; a cushioning plate which is assembled to the inner side of the cylindrical body; and an abrasion resistant steel plate which is assembled to the inner side of the cushioning plate and is able to cause impacts to the waste raw material.

9. The apparatus of claim 2, wherein the base is engaged about a hinge at the ground at the side to the outlet of the crushing drum and is configured to ascend or descend about the hinge with the aid of a hydraulic cylinder supported on the ground at the side to the inlet of the crushing drum.

10. The apparatus of claim 2, wherein the crushing drum comprises: a cylindrical body which is formed of the inlet and the outlet; a cushioning plate which is assembled to the inner side of the cylindrical body; and an abrasion resistant steel plate which is assembled to the inner side of the cushioning plate and is able to cause impacts to the waste raw material.

11. The apparatus of claim 3, wherein the base is engaged about a hinge at the ground at the side to the outlet of the crushing drum and is configured to ascend or descend about the hinge with the aid of a hydraulic cylinder supported on the ground at the side to the inlet of the crushing drum.

12. The apparatus of claim 3, wherein the crushing drum comprises: a cylindrical body which is formed of the inlet and the outlet; a cushioning plate which is assembled to the inner side of the cylindrical body; and an abrasion resistant steel plate which is assembled to the inner side of the cushioning plate and is able to cause impacts to the waste raw material.

13. The apparatus of claim 4, wherein the base is engaged about a hinge at the ground at the side to the outlet of the crushing drum and is configured to ascend or descend about the hinge with the aid of a hydraulic cylinder supported on the ground at the side to the inlet of the crushing drum.

14. The apparatus of claim 4, wherein the crushing drum comprises: a cylindrical body which is formed of the inlet and the outlet; a cushioning plate which is assembled to the inner side of the cylindrical body; and an abrasion resistant steel plate which is assembled to the inner side of the cushioning plate and is able to cause impacts to the waste raw material.

15. The apparatus of claim 5, wherein the base is engaged about a hinge at the ground at the side to the outlet of the crushing drum and is configured to ascend or descend about the hinge with the aid of a hydraulic cylinder supported on the ground at the side to the inlet of the crushing drum.

16. The apparatus of claim 5, wherein the crushing drum comprises: a cylindrical body which is formed of the inlet and the outlet; a cushioning plate which is assembled to the inner side of the cylindrical body; and an abrasion resistant steel plate which is assembled to the inner side of the cushioning plate and is able to cause impacts to the waste raw material.

17. The apparatus of claim 6, wherein the base is engaged about a hinge at the ground at the side to the outlet of the crushing drum and is configured to ascend or descend about the hinge with the aid of a hydraulic cylinder supported on the ground at the side to the inlet of the crushing drum.

18. The apparatus of claim 6, wherein the crushing drum comprises: a cylindrical body which is formed of the inlet and the outlet; a cushioning plate which is assembled to the inner side of the cylindrical body; and an abrasion resistant steel plate which is assembled to the inner side of the cushioning plate and is able to cause impacts to the waste raw material.

\* \* \* \* \*